US012634619B2

(12) United States Patent
Fridman et al.

(10) Patent No.: US 12,634,619 B2
(45) Date of Patent: *May 19, 2026

(54) APPARATUS, SYSTEM, AND METHOD OF ACOUSTIC FEEDBACK (AFB) MITIGATION

(71) Applicant: SILENTIUM LTD., Nes Ziona (IL)

(72) Inventors: Tzvi Fridman, Nes Tziona (IL); Sivan Grotas Mussan, Rishon Lezion (IL); Yael Ronen, Ness Tziona (IL); Nikolaos Zafeiropoulos, Athens (GR)

(73) Assignee: SILENTIUM LTD., Nes Ziona (IL)

( * ) Notice: Subject to any disclaimer, the term of this patent is extended or adjusted under 35 U.S.C. 154(b) by 75 days.

This patent is subject to a terminal disclaimer.

(21) Appl. No.: 18/516,475

(22) Filed: Nov. 21, 2023

(65) Prior Publication Data

US 2024/0179451 A1 May 30, 2024

Related U.S. Application Data

(63) Continuation of application No. 18/166,622, filed on Feb. 9, 2023, now Pat. No. 11,863,930.

(Continued)

(51) Int. Cl.

| | |
|---|---|
| ***H04R 1/24*** | (2006.01) |
| ***H04R 1/08*** | (2006.01) |
| ***H04R 3/04*** | (2006.01) |

(52) U.S. Cl.

CPC ................. *H04R 1/24* (2013.01); *H04R 1/08* (2013.01); *H04R 3/04* (2013.01)

(58) Field of Classification Search

CPC . H04R 1/24; H04R 1/08; H04R 3/002; H04R 3/02; H04R 3/04; H04R 3/007; G10L 2015/225

(Continued)

(56) References Cited

U.S. PATENT DOCUMENTS

| | | | | |
|---|---|---|---|---|
| 6,198,828 | B1 | 3/2001 | Kuo | |
| 8,165,310 | B2 * | 4/2012 | Christoph | H04M 9/082 381/112 |

(Continued)

FOREIGN PATENT DOCUMENTS

| | | | |
|---|---|---|---|
| AT | 322563 | B | 5/1975 |
| CN | 102026080 | A | 4/2011 |

(Continued)

OTHER PUBLICATIONS

Muhammad Tahir Akhtar et al., "On Active Noise Control Systems With Online Acoustic Feedback Path Modeling", IEEE Transactions on Audio, Speech, and Language Processing, vol. 15, No. 2, Feb. 2007, pp. 593-600.

(Continued)

*Primary Examiner* — William A Jerez Lora
(74) *Attorney, Agent, or Firm* — Shichrur & Co.

(57) ABSTRACT

For example, an Acoustic Feedback (AFB) mitigator may mitigate AFB between at least one acoustic transducer and at least one acoustic sensor. For example, the AFB mitigator may include a first filter to generate a first filtered signal by filtering a first input signal, the first input signal nay be based on a transducer acoustic pattern to be output by the acoustic transducer; and a second filter to generate a second filtered signal by filtering the first input signal, wherein the second filter may include an adaptive filter, which may be adapted based on a difference between an AFB-mitigated signal and the second filtered signal. For example, the AFB-mitigated signal may be based on a difference between a second input signal and the first filtered signal, the second input signal based on a sensor acoustic pattern sensed by the acoustic sensor.

26 Claims, 13 Drawing Sheets

Related U.S. Application Data

(60) Provisional application No. 63/308,708, filed on Feb. 10, 2022.

(58) Field of Classification Search
USPC ...... 381/55, 58, 71.1, 71.11, 83, 93, 95, 121
See application file for complete search history.

(56) References Cited

U.S. PATENT DOCUMENTS

| | | | | |
|---|---|---|---|---|
| 8,295,519 | B2 * | 10/2012 | Elmedyb | H04R 25/453 381/95 |
| 10,757,503 | B2 | 8/2020 | Colich | |
| 11,482,205 | B2 * | 10/2022 | Fridman | G10K 11/17881 |
| 11,863,930 | B2 | 1/2024 | Fridman et al. | |
| 2006/0093173 | A1 * | 5/2006 | Hamacher | H04R 25/453 381/317 |
| 2009/0028366 | A1 | 1/2009 | Tklinkby | |
| 2009/0067651 | A1 | 3/2009 | Klinkby et al. | |
| 2010/0020979 | A1 | 1/2010 | Elmedyb et al. | |
| 2014/0044275 | A1 | 2/2014 | Goldstein et al. | |
| 2014/0169579 | A1 * | 6/2014 | Azmi | H04R 1/1083 381/71.6 |
| 2014/0355802 | A1 | 12/2014 | Elmedyb et al. | |
| 2015/0063614 | A1 | 3/2015 | Petersen et al. | |
| 2015/0110317 | A1 | 4/2015 | Salvetti et al. | |
| 2015/0139460 | A1 * | 5/2015 | Pedersen | H04R 3/002 381/318 |
| 2015/0243271 | A1 | 8/2015 | Goldstein | |
| 2016/0300562 | A1 * | 10/2016 | Goldstein | G10K 11/17879 |
| 2020/0342082 | A1 | 10/2020 | Sapozhnykov et al. | |
| 2020/0380947 | A1 | 12/2020 | Zaferopoulos et al. | |
| 2020/0380948 | A1 | 12/2020 | Honda et al. | |
| 2020/0402493 | A1 | 12/2020 | Barnes | |
| 2022/0270583 | A1 | 8/2022 | Fridman et al. | |

FOREIGN PATENT DOCUMENTS

| | | |
|---|---|---|
| CN | 112053676 A | 12/2020 |
| EP | 3 712 884 | 9/2020 |
| JP | 2019537398 A | 12/2019 |

OTHER PUBLICATIONS

Office Action for U.S. Appl. No. 17/670,547, mailed on May 24, 2022, 18 pages.
Notice of Allowance for U.S. Appl. No. 17/670,547, mailed on Aug. 15, 2022, 8 pages.
International Search Report and the Written Opinion for International Application No. PCT/IB2022/051268, mailed on Jun. 29, 2022, 9 pages.
Office Action for U.S. Appl. No. 18/166,622, mailed on May 8, 2023, 8 pages.
Notice of Allowance for U.S. Appl. No. 18/166,622, mailed on Aug. 22, 2023, 12 pages.
International Search Report and the Written Opinion for International Application No. PCT/IB2023/051173, mailed on Jun. 26, 2023, 12 pages.
Search Report for European Patent Application No. 22752442.8, mailed on Dec. 19, 2024, 14 pages.
Office Action for Japanese Patent Application No. 2023-548579, mailed on Nov. 25, 2025, 5 pages.
Search Report for European Patent Application No. 23752537.3, mailed on Dec. 12, 2025, 9 pages.
Office Action for Chinese Patent Application No. 2022800264996, mailed on Apr. 2, 2026, 18 pages.

* cited by examiner

APPARATUS, SYSTEM, AND METHOD OF ACOUSTIC FEEDBACK (AFB) MITIGATION

CROSS-REFERENCE

This application claims the benefit of and priority from U.S. Provisional Patent Application No. 63/308,708, entitled "APPARATUS, SYSTEM, AND METHOD OF ACOUSTIC FEEDBACK (AFB) MITIGATION", filed Feb. 10, 2022, the entire disclosure of which is incorporated herein by reference.

TECHNICAL FIELD

Aspects described herein generally relate to Acoustic Feedback (AFB) mitigation.

BACKGROUND

In some devices and/or systems there may be a need for a technical solution to address one or more technical issues of Acoustic Feedback (AFB) between an acoustic transducer, e.g., a speaker, and an acoustic sensor, e.g., a microphone.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
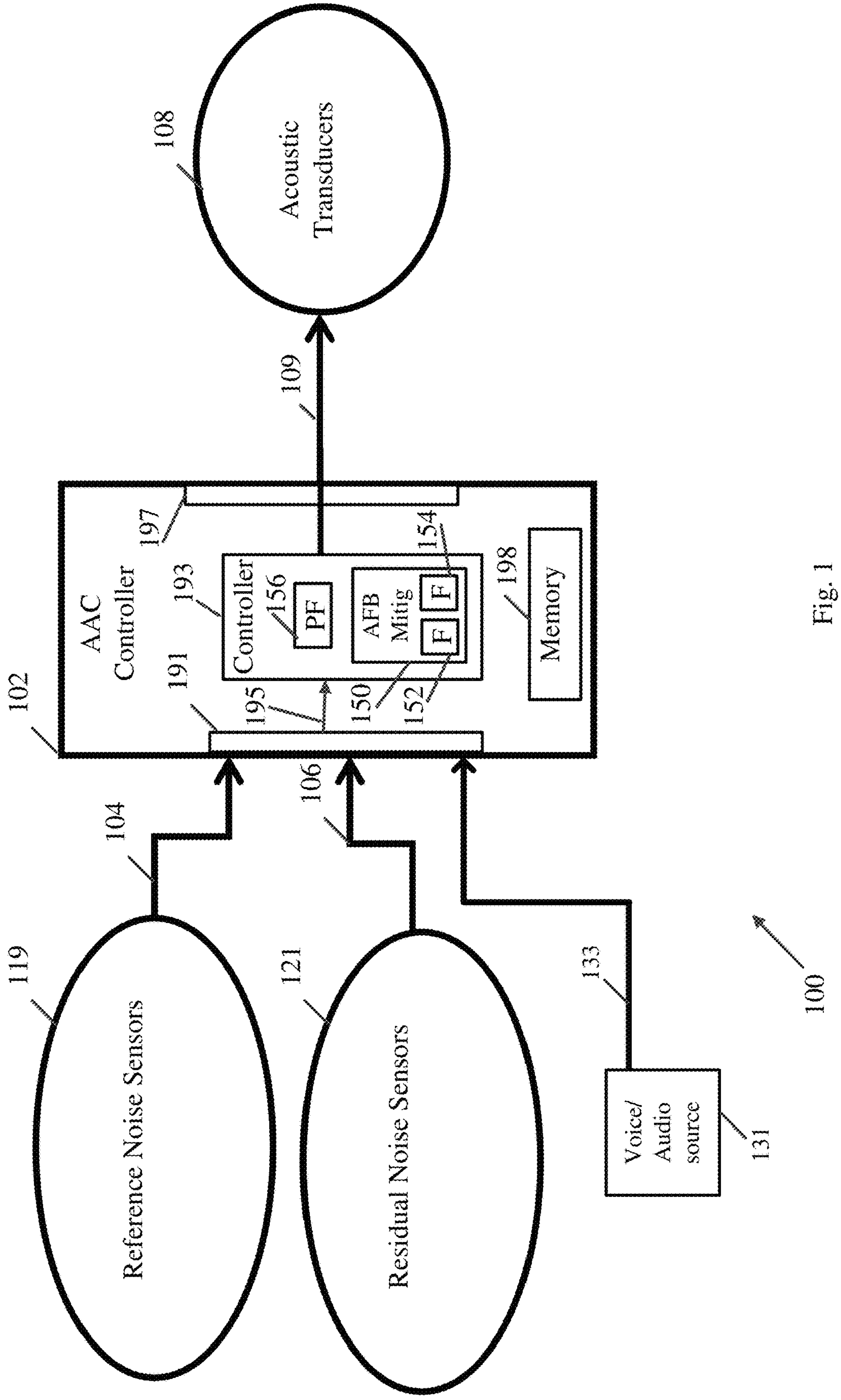
FIG. 1 is a schematic block diagram illustration of an Active Acoustic Control (AAC) system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

Some demonstrative aspects include systems and methods, which may be efficiently implemented for controlling noise, for example, reducing or eliminating undesirable noise, for example, noise in one or more frequency ranges, e.g., generally low, mid and/or high frequencies, as described below.

Some demonstrative aspects may include methods and/or systems of Active Acoustic Control (AAC) configured to control acoustic energy and/or wave amplitude of one or more acoustic patterns produced by one or more acoustic sources, which may include known and/or unknown acoustic sources, e.g., as described below.

In some demonstrative aspects, an AAC system may be configured as, and/or may perform one or more functionalities of, an Active Noise Control (ANC) system, and/or an Active Sound Control (ASC) system, which may be configured to control, reduce and/or eliminate the noise energy and/or wave amplitude of one or more acoustic patterns ("primary patterns") produced by one or more noise sources, which may include known and/or unknown noise sources, e.g., as described below.

In some demonstrative aspects, an AAC system may be configured to produce an acoustic control pattern (also referred to as "sound control pattern" or "secondary pattern"), e.g., including a destructive noise pattern and/or any other sound control pattern, e.g., as described below.

In some demonstrative aspects, the AAC system may be configured to generate the acoustic control pattern, for example, based on one or more of the primary patterns, for example, such that a controlled sound zone, for example, a reduced noise zone, e.g., a quiet zone, may be created by a combination of the secondary and primary patterns, e.g., as described below.

In some demonstrative aspects, the AAC system may be configured to control, reduce and/or eliminate noise within a predefined location, area or zone ("the acoustic control zone", "the noise-control zone", also referred to as the "quiet zone", or "Quiet Bubble™M"), e.g., as described below.

In some demonstrative aspects, the AAC system may be configured to control, reduce and/or eliminate noise within the acoustic control zone even without, for example, regardless of, and/or without using, a-priori information regarding the primary patterns and/or the one or more noise sources, e.g., as described below.

For example, the AAC system may be configured to control, reduce and/or eliminate noise within the acoustic control zone, e.g., even independent of, regardless of and/or without knowing in advance, one or more attributes of one or more of the noise sources and/or one or more of the primary patterns, for example, the number, type, location and/or other attributes of one or more of the primary patterns and/or one or more of the noise sources, e.g., as described below.

Some demonstrative aspects are described herein with respect to AAC systems and/or methods configured to reduce and/or eliminate the noise energy and/or wave amplitude of one or more acoustic patterns within a quiet zone, e.g., as described below.

However, in other aspects, any other AAC and/or sound control systems and/or methods may be configured to control in any other manner any other acoustic energy and/or wave amplitude of one or more acoustic patterns within an acoustic control zone (sound control zone), for example, to affect, alter and/or modify the sound energy and/or wave amplitude of one or more acoustic patterns within a predefined zone, e.g., as described below.

In one example, the AAC systems and/or methods may be configured to selectively reduce and/or eliminate the acoustic energy and/or wave amplitude of one or more types of acoustic patterns within the acoustic control zone and/or to selectively increase and/or amplify the acoustic energy and/or wave amplitude of one or more other types of acoustic patterns within the acoustic control zone; and/or to selectively maintain and/or preserve the acoustic energy and/or wave amplitude of one or more other types of acoustic patterns within the acoustic control zone, e.g., as described below.

In some demonstrative aspects, an AAC system may be configured as, and/or may perform or more functionalities of, a sound control system, for example, a personal sound control system (also referred to as a "Personal Sound Bubble (PSB)™ system"), which may be configured to produce a sound control pattern, which may be based on at least one audio input, for example, such that at least one personal sound zone, may be created based on the audio input, e.g., as described below.

In some demonstrative aspects, the AAC system may be configured to control sound within at least one predefined location, area or zone, e.g., at least one PSB, for example, based on audio to be heard by a user. In one example, the PSB may be configured to include an area around a head and/or ears of the user, e.g., as described below.

In some demonstrative aspects, the AAC system may be configured to control a sound contrast, e.g., a difference, between one or more first sound patterns and one or more second sound patterns in the PSB, e.g., as described below.

In some demonstrative aspects, for example, the AAC system may be configured to control a sound contrast between one or more first sound patterns of audio to be heard by the user, and one or more second sound patterns, e.g., as described below.

In some demonstrative aspects, for example, the AAC system may be configured to selectively increase and/or amplify the sound energy and/or wave amplitude of one or more types of acoustic patterns within the PSB, e.g., based on the audio to be heard in the PSB; to selectively reduce and/or eliminate the sound energy and/or wave amplitude of one or more types of acoustic patterns within the PSB, e.g., based on acoustic signals which are to be reduced and/eliminated; and/or to selectively maintain and/or preserve the sound energy and/or wave amplitude of one or more other types of acoustic patterns within the PSB, e.g., as described below.

In some demonstrative aspects, the AAC system may be configured to control the sound within the PSB based on any other additional or alternative input or criterion.

In some demonstrative aspects, the AAC system may be configured to control, reduce, and/or eliminate the acoustic energy and/or wave amplitude of one or more of the primary patterns within the acoustic control zone.

In some demonstrative aspects, the AAC system may be configured to control, reduce, and/or eliminate noise within the acoustic control zone in a selective and/or configurable manner, e.g., based on one or more predefined noise pattern attributes, such that, for example, the noise energy, wave amplitude, phase, frequency, direction and/or statistical properties of one or more first primary patterns may be affected by the secondary pattern, while the secondary pattern may have a reduced effect or even no effect on the noise energy, wave amplitude, phase, frequency, direction and/or statistical properties of one or more second primary patterns, e.g., as described below.

In some demonstrative aspects, the AAC system may be configured to control, reduce and/or eliminate the acoustic energy and/or wave amplitude of the primary patterns on a predefined envelope or enclosure surrounding and/or enclosing the acoustic control zone and/or at one or more predefined locations within the acoustic control zone.

In one example, the acoustic control zone may include a two-dimensional zone, e.g., defining an area in which the acoustic energy and/or wave amplitude of one or more of the primary patterns is to be controlled, reduced and/or eliminated.

According to this example, the AAC system may be configured to control, reduce and/or eliminate the acoustic energy and/or wave amplitude of the primary patterns along a perimeter surrounding the acoustic control zone and/or at one or more predefined locations within the acoustic control zone.

In one example, the acoustic control zone may include a three-dimensional zone, e.g., defining a volume in which the acoustic energy and/or wave amplitude of one or more of the primary patterns is to be controlled, reduced and/or eliminated. According to this example, the AAC system may be configured to control, reduce and/or eliminate the acoustic energy and/or wave amplitude of the primary patterns on a surface enclosing the three-dimensional volume.

In one example, the acoustic control zone may include a spherical volume and the AAC system may be configured to control, reduce and/or eliminate the acoustic energy and/or wave amplitude of the primary patterns on a surface of the spherical volume.

In another example, the acoustic control zone may include a cubical volume and the AAC system may be configured to control, reduce and/or eliminate the acoustic energy and/or wave amplitude of the primary patterns on a surface of the cubical volume.

In other aspects, the acoustic control zone may include any other suitable volume, which may be defined, for example, based on one or more attributes of a location at which the acoustic control zone is to be maintained.

Reference is now made to FIG. 1, which schematically illustrates an AAC system 100, in accordance with some demonstrative aspects.

Figure 2:
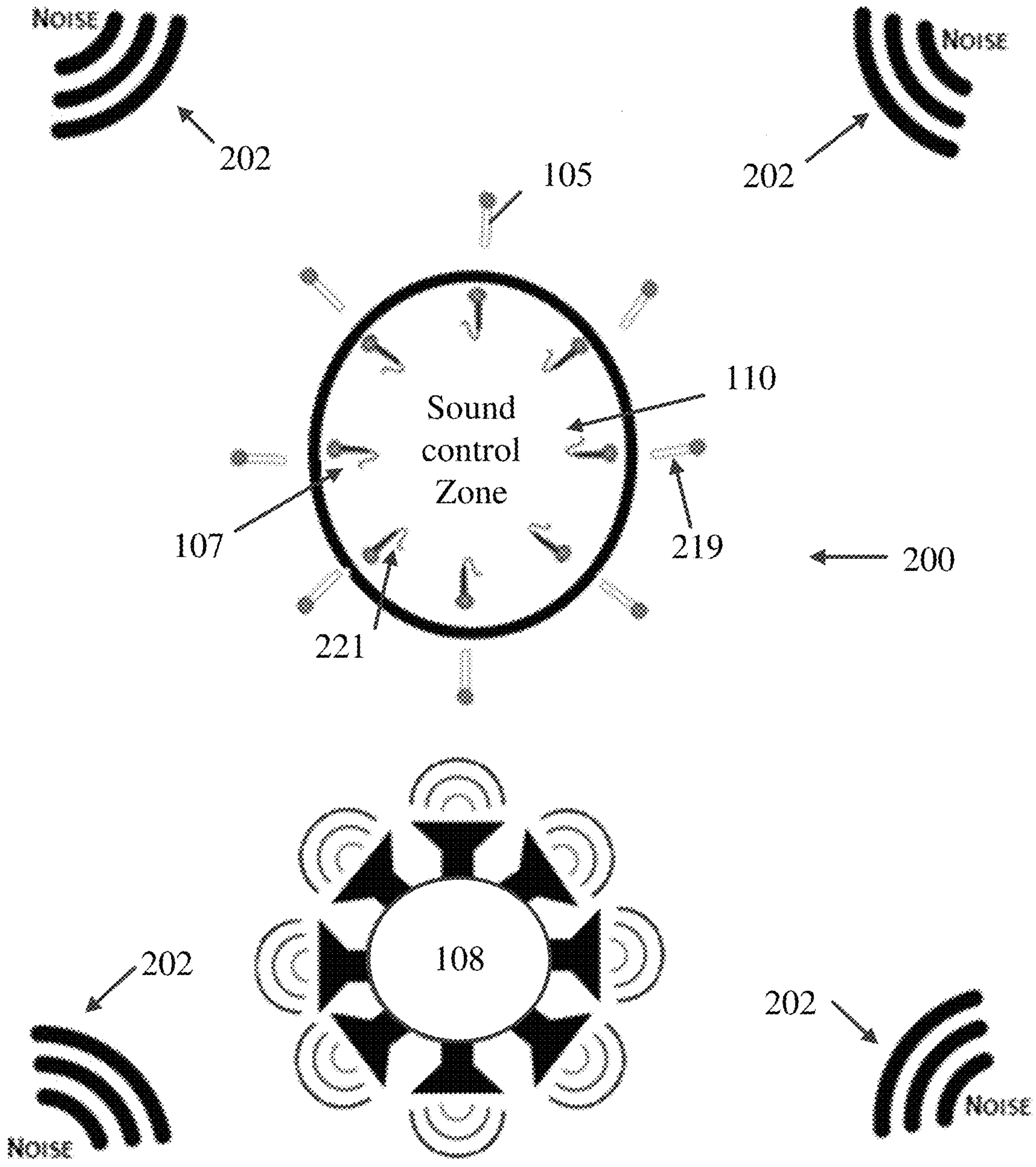
FIG. 2 is a schematic illustration of a deployment scheme of components of the AAC system of FIG. 1, in accordance with some demonstrative aspects.

Reference is also made to FIG. 2, which schematically illustrates a deployment scheme 200 of components of an AAC system, in accordance with some demonstrative aspects. For example, deployment scheme 200 may include a deployment of one or more elements of the AAC system 100 of FIG. 1.

In some demonstrative aspects, AAC system 100 may include, operate as, and/or perform functionalities of, an Active Noise Cancelation (ANC) system, an acoustic control system, and/or a sound control system, e.g., as described below.

In some demonstrative aspects, AAC system 100 may include a controller 102 (also referred to as "AAC controller") to control sound within at least one AAC zone (also referred to as "sound-control zone" or "acoustic control zone") 110, e.g., as described in detail below.

In some demonstrative aspects, controller 102 may include, or may be implemented, partially or entirely, by circuitry and/or logic, e.g., one or more processors including circuitry and/or logic, and/or memory circuitry and/or logic. Additionally or alternatively, one or more functionalities of radar controller 102 may be implemented by logic, which may be executed by a machine and/or one or more processors, e.g., as described below.

In one example, controller 102 may include at least one memory 198, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, at least part of the functionality of controller 102 may be implemented by an integrated circuit, for example, a chip, e.g., a System on Chip (SoC).

In other aspects, controller 102 may be implemented by any other logic and/or circuitry, and/or according to any other architecture.

In some demonstrative aspects, the AAC zone 110 may include an enclosed space, e.g., as described below.

In some demonstrative aspects, sound-control zone 110 may be located inside a vehicle, and AAC system 100 may be deployed as part of the vehicle. In other aspects, sound-control zone 110 may be located at any non-vehicular area or location.

In some demonstrative aspects, the enclosed space may include a cabin of a vehicle, for example, a car, a bus, and/or a truck, e.g., as described below.

In some demonstrative aspects, the enclosed space may include any other cabin, e.g., a cabin of an airplane, a cabin of a train, a cabin of a medical system, an area of a room, and the like.

In some demonstrative aspects, the AAC zone 110 may include a space around one or more ears of a user.

In one example, AAC system may be implemented as part of headphones, or earphones, e.g., to control sound within AAC zone 110, which may be defined around an ear of a user of the headphones or earphones.

In one example, AAC system may be implemented as part of furniture, e.g., a chair, a sofa, a bed, a headrest, or the like, e.g., to control sound within AAC zone 110, which may be defined around an ear of a user of the furniture.

In other aspects, the enclosed space may include any other enclosed part or area of a space, e.g., vehicular or non-vehicular.

In some demonstrative aspects, sound control zone 110 may include a three-dimensional (3D) zone. For example, sound control zone 110 may include a spherical zone.

In another example, sound control zone 110 may include any other 3D zone.

In some demonstrative aspects, AAC system 100 may be configured to control sound and/or noise within zone 110, for example, to provide an improved driving experience for driver and/or one or more passengers of the vehicle, for example, by controlling sound and/or noise within zone 110 in a way which provide an improved music and/or sound experience within the vehicle, an improved quality of phone conversations, and/or the like.

In some demonstrative aspects, AAC controller 102 may include, or may be implemented with, an input 191, which may be configured to receive input information 195, e.g., as described below.

In some demonstrative aspects, AAC controller 102 may include a controller 193 configured to determine the sound control pattern to control sound within the at least one sound control zone 110, for example, based on the input information 195, e.g., as described below.

In some demonstrative aspects, the input information 195 may include a plurality of noise inputs 104, e.g., from one or more acoustic sensors (also referred to as "primary sensors", "noise sensors" or "reference sensors") 119, representing acoustic noise at a plurality of predefined noise sensing locations 105, e.g., as described below.

In some demonstrative aspects, AAC controller 102 may receive noise inputs 104 from one or more acoustic sensors 119, which may include one or more physical sensors, e.g., microphones, accelerometers, tachometers and the like, located at one or more of locations 105, and/or one or more virtual sensors configured to estimate the acoustic noise at one or more of locations 105, e.g., as described below.

In some demonstrative aspects, the input information 195 may include a plurality of residual-noise inputs 106, e.g., from one or more residual-noise acoustic sensors (also referred to as "error sensors", "monitoring sensors", or "secondary sensors") 121, representing acoustic residual-noise at a plurality of predefined residual-noise sensing locations 107, which are located within sound-control zone 110, e.g., as described below.

In some demonstrative aspects, AAC controller 102 may receive residual-noise inputs 106 from one or more acoustic sensors 121, which may include one or more physical sensors, e.g., microphones, accelerometers, tachometers, and/or the like, located at one or more of locations 107, and/or from one or more virtual sensors configured to estimate the residual-noise at one or more of locations 107, e.g., as described below.

In some demonstrative aspects, AAC system 100 may include at least one acoustic transducer 108, e.g., a speaker, a shaker, and/or any other actuator. For example, AAC controller 102 may control acoustic transducer 108 to generate an acoustic sound control pattern configured to control the sound within sound control zone 110, e.g., as described in detail below.

In one example, the noise inputs 104 may represent noise to be controlled, e.g., mitigated and/canceled, within the sound control zone 110.

In one example, the residual-noise inputs 106 may represent residual noise at the one or more locations 107 within the sound control zone 110. For example, the residual-noise inputs 106 may represent residual noise, e.g., a part of the noise outside the sound control zone 110, for example, based on the sound control pattern.

In some demonstrative aspects, the at least one acoustic transducer 108 may include, for example, an array of one or more acoustic transducers, e.g., at least one suitable speaker, to produce the sound control pattern based on sound control signal 109.

In some demonstrative aspects, the at least one acoustic transducer 108 may be positioned at one or more locations, which may be determined based on one or more attributes of sound control zone 110, e.g., a size and/or shape of zone 110, one or more expected attributes inputs 104, one or more expected attributes of one or more potential actual noise sources 202, e.g., an expected location and/or directionality of noise sources 202 relative to sound control zone 110, a number of noise sources 202, and the like.

In one example, acoustic transducer 108 may include a speaker array including a predefined number, denoted M, of speakers or a multichannel acoustical source. In some demonstrative aspects, acoustic transducer 108 may include an array of speakers implemented using a suitable "compact acoustical source" positioned at a suitable location, e.g., external to zone 110.

In another example, the array of speakers may be implemented using a plurality of speakers distributed in space, e.g., around sound control zone 110.

In some demonstrative aspects, one or more of locations 105 may be distributed in any combination of locations on and/or external to the spherical volume, e.g., one or more locations surrounding the spherical volume, e.g., as described below.

In some demonstrative aspects, one or more locations 105 may be distributed externally to sound control zone 110. For example, one or more of locations 105 may be distributed on, or in proximity to, an envelope or enclosure surrounding sound control zone 110.

For example, if sound control zone 110 is defined by a spherical volume, then one or more of locations 105 may be distributed on a surface of the spherical volume and/or external to the spherical volume.

In some demonstrative aspects, locations 107 may be distributed within sound control zone 110, for example, in proximity to the envelope of sound control zone 110.

For example, if zone 110 is defined by a spherical volume, then locations 107 may be distributed on a spherical surface having a radius, which is lesser than a radius of sound control zone 110.

In some demonstrative aspects, AAC system 100 may include one or more first acoustic sensors ("primary sensors") 119 to sense the acoustic noise at one or more of the plurality of noise sensing locations 105.

In some demonstrative aspects, AAC system 100 may include one or more second acoustic sensors ("error sensors" or "monitoring sensors") 121 to sense the acoustic residual-noise at one or more of the plurality of residual-noise sensing locations 107.

In some demonstrative aspects, one or more of the error sensors and/or one or more of the primary sensors may be implemented using one or more "virtual sensors" ("virtual microphones"). A virtual microphone corresponding to a particular microphone location may be implemented by any suitable algorithm and/or method capable of evaluating an acoustic pattern, which would have been sensed by an actual acoustic sensor located at the particular microphone location.

In some demonstrative aspects, AAC controller 102 may be configured to simulate and/or perform the functionality of the virtual microphone, e.g., by estimating and/or evaluating the acoustic noise pattern at the particular location of the virtual microphone.

In some demonstrative aspects, an AAC system e.g., AAC system 100 (FIG. 1), may include a first array 219 of one or more primary sensors, e.g., microphones, accelerometers, tachometers and the like, configured to sense the primary patterns at one or more of locations 105. For example, array 219 may include a plurality of acoustic sensors 119 (FIG. 1). For example, array 219 may include a microphone to output a noise signal 104 (FIG. 1) including, for example, a sequence of N samples per second. For example, N may be 48000 samples per second, e.g., if the microphone operates at a sampling rate of about 48 KHz. The noise signal 104 (FIG. 1) may include any other suitable signal having any other suitable sampling rate and/or any other suitable attributes.

In some demonstrative aspects, one or more of the sensors of array 219 may be implemented using one or more "virtual sensors". For example, array 219 may be implemented by a combination of at least one microphone and at least one virtual microphone. A virtual microphone corresponding to a particular microphone location of locations 105 may be implemented by any suitable algorithm and/or method, e.g., as part of controller 102 (FIG. 1) or any other element of system 100 (FIG. 1), capable of evaluating an acoustic pattern, which would have been sensed by an acoustic sensor located at the particular microphone location. For example, controller 102 (FIG. 1) may be configured to evaluate the acoustic pattern of the virtual microphone based on at least one actual acoustic pattern sensed by the at least one microphone 119 (FIG. 1) of array 219.

In some demonstrative aspects, AAC system 100 (FIG. 1) may include a second array 221 of one or more error sensors, e.g., microphones, configured to sense the acoustic residual-noise at one or more of locations 107. For example, array 221 may include a plurality of acoustic sensors 121 (FIG. 1). For example, the error sensors may include one or more sensors to sense the acoustic residual-noise patterns on a spherical surface within spherical sound control zone 110.

In some demonstrative aspects, one or more of the sensors of array 221 may be implemented using one or more "virtual sensors". For example, array 221 may include a combination of at least one microphone and at least one virtual microphone. A virtual microphone corresponding to a particular microphone location of locations 107 may be implemented by any suitable algorithm and/or method, e.g., as part of controller 102 (FIG. 1) or any other element of system 100 (FIG. 1), capable of evaluating an acoustic pattern, which would have been sensed by an acoustic sensor located at the particular microphone location. For example, controller 102 (FIG. 1) may be configured to evaluate the acoustic pattern of the virtual microphone based on at least one actual acoustic pattern sensed by the at least one microphone 121 (FIG. 1) of array 221.

In some demonstrative aspects, the number, location and/or distribution of the locations 105 and/or 107, and/or the number, location and/or distribution of one or more acoustic sensors at one or more of locations 105 and 107 may be determined based on a size of sound control zone 110 and/or of an envelope of sound control zone 110, a shape of sound control zone 110 or of the envelope of sound control zone 110, one or more attributes of the acoustic sensors to be located at one or more of locations 105 and/or 107, e.g., a sampling rate of the sensors, and the like.

In one example, one or more acoustic sensors, e.g., microphones, accelerometers, tachometers and the like, may be deployed at locations 105 and/or 107 according to the Spatial Sampling Theorem, e.g., as defined below by Equation 1.

For example, a number of the primary sensors, a distance between the primary sensors, a number of the error sensors and/or a distance between the error sensors may be determined in accordance with the Spatial Sampling Theorem, e.g., as defined below by Equation 1.

In one example, the primary sensors and/or the error sensors may be distributed, e.g., equally or non-equally distributed, with a distance, denoted d, from one another. For example, the distance d may be determined as follows:

$$d \leq \frac{c}{2 \cdot f} \qquad (1)$$

wherein c denotes the speed of sound and $f_{max}$ denotes a maximal frequency at which sound control is desired.

For example, in case the maximal frequency of interest is $f_{max}$=100 [Hz], the distance d may be determined as $$d \leq \frac{343}{2 \cdot 100} = 1.71[m].$$

As shown in FIG. 2 deployment scheme 200 is configured with respect to a circular or spherical sound control zone 110. For example, one or more locations 105 are distributed, e.g., substantially evenly distributed, in a spherical or circular manner around sound control zone 110, and locations 107 are distributed, e.g., substantially evenly distributed, in a spherical or circular manner within sound control zone 110.

However in other aspects, components of AAC system 100 may be deployed according to any other deployment scheme including any suitable distribution of locations 105 and/or 107, e.g., configured with respect a sound control zone of any other suitable form and/or shape.

In some demonstrative aspects, AAC controller 102 may be configured to determine the sound control pattern to be reduced according to at least one noise parameter, e.g., energy, amplitude, phase, frequency, direction, and/or statistical properties within sound control zone 110, e.g., as described in detail below.

In some demonstrative aspects, AAC controller 102 may determine the sound control pattern to selectively reduce one or more predefined first noise patterns within sound control zone 110, while not reducing one or more second noise patterns within sound control zone 110, e.g., as described below.

In some demonstrative aspects, sound control zone 110 may be located within an interior of a vehicle, and AAC controller 102 may determine the sound control pattern to selectively reduce one or more first noise patterns, e.g., including a road noise pattern, a wind noise pattern, and/or an engine noise pattern, while not reducing one or more second noise patterns, e.g., including an audio noise pattern of an audio device located within the vehicle, a horn noise pattern, a siren noise pattern, a hazard noise pattern of a hazard, an alarm noise pattern of an alarm signal, a noise pattern of an informational signal, and the like.

In other aspects, sound control zone 110 may be in any other location and/or area, e.g., vehicular or non-vehicular, and AAC controller 102 may be configured to determine the sound control pattern to selectively reduce any other one or more first noise patterns, while not reducing any other one or more second noise patterns.

In some demonstrative aspects, AAC controller 102 may determine the sound control pattern, e.g., even without having information relating to one or more noise-source attributes of one or more of actual noise sources 202 generating the acoustic noise at the noise sensing locations 105.

For example, the noise-source attributes may include a number of noise sources 202, a location of noise sources 202, a type of noise sources 202 and/or one or more attributes of one or more noise patterns generated by one or more of noise sources 202.

In some demonstrative aspects, AAC controller 102 may be configured to determine the sound control pattern, for example, while taking into account one or more factors, for example, one or more acoustic transfer-functions between elements of AAC system 100, e.g., acoustic transfer-functions between the at least one acoustic transducer 108 and one or more residual-noise sensors 121; and/or statistical characteristics of noise to be handled by the AAC system 100, e.g., as described below.

In some demonstrative aspects, AAC controller 102 may be configured to generate the sound control pattern 109 based on voice and/or audio signals to be heard in the sound control zone 110, e.g., as described below.

In some demonstrative aspects, the input information 195 may include voice and/or audio signals 133 from a voice/audio source 131.

In one example, voice and/or audio signals 133 may include audio and/or voice signals to be heard in the sound control zone 110, e.g., music, a conversation, a phone call, or the like.

In some demonstrative aspects, AAC controller 102 may be configured to generate the sound control pattern 109 based on the voice and/or audio signals 133, e.g., as described below.

In other aspects, AAC controller 102 may be configured to determine the sound control pattern 109 based on any other additional or alternative factors, criteria, attributes, and/or parameters.

In some demonstrative aspects, AAC controller 102 may include an Acoustic Feedback (AFB) mitigator 150 (also referred to as "AFB controller", "AFB canceller", Feedback Canceller (FBC)", "Echo mitigator", or "Echo canceller"), which may be configured to mitigate AFB between acoustic transducers 108 and one or more acoustic sensors of AAC system 100, for example, one or more of reference noise acoustic sensors 119 and/or residual-noise sensors 121, e.g., as described below.

In one example, AFB mitigator 150 may be configured to mitigate AFB between one or more acoustic transducers 108 and one or more of reference noise acoustic sensors 119, e.g., as described below.

In another example, AFB mitigator 150 may be configured to mitigate AFB between one or more acoustic transducers 108 and one or more of residual-noise sensors 121, e.g., as described below.

Some demonstrative aspects are described herein with respect to an AFB mitigator, e.g., AFB mitigator 150, implemented by a controller, e.g., controller 102, of an AAC system, e.g., AAC system 100. However, in other aspects, an AFB mitigator, e.g., AFB mitigator 150, may be implemented as part of a controller of any other additional or alternative type of device and/or system.

In some demonstrative aspects, for example, in some use cases, scenarios, deployments, and/or implementations, there may be a need to provide a technical solution to mitigate AFB ("non-constant AFB), which may not be constant.

For example, an acoustic medium between an acoustic transducer of an AAC system, e.g., acoustic transducer 108, and an acoustic sensor of the AAC system, e.g., reference noise sensor 119 and/or residual-noise sensor 121, may not be fixed or constant.

In one example, the acoustic medium between an acoustic transducer of an AAC system, e.g., acoustic transducer 108, and an acoustic sensor of the AAC system, e.g., reference noise sensor 119 and/or residual-noise sensor 121, may vary, for example, based on changes in an environment of the AAC system, e.g., temperature, humidity, or the like.

In another example, the acoustic medium between an acoustic transducer of an AAC system, e.g., acoustic transducer 108, and an acoustic sensor of the AAC system, e.g., reference noise sensor 119 and/or residual-noise sensor 121, may vary, for example, based on changes in physical locations of and/or distances between the acoustic transducer and/or the acoustic sensor.

In some demonstrative aspects, for example, in some use cases, scenarios, deployments, and/or implementations, there may be a need to provide a technical solution to implement an adaptive AFB mitigator, for example, to mitigate non-constant AFB. For example, an implementation using a fixed AFB mitigator may not be suitable to provide sufficient results.

In some demonstrative aspects, AFB mitigator 150 may be configured as an adaptive AFB mitigator, e.g., as described below.

In some demonstrative aspects, AFB mitigator 150 may be configured to adapt to changes in an acoustic medium between an acoustic transducer of AAC system 100, e.g., acoustic transducer 108, and an acoustic sensor of the AAC system 100, e.g., reference noise sensor 119, as descried below.

In some demonstrative aspects, AFB mitigator 150 may utilize at least one adaptive filter, which may be configured to adapt to changes in the acoustic medium, e.g., as described below.

In some demonstrative aspects, the adaptive filter may include a Finite Impulse Response (FIR) filter, e.g., as described below.

In one example, a FIR filter having a filter response, denoted h, e.g., $$h: \{h_n\}_{n=1}^{N},$$

may be applied to an input signal, denoted x, e.g., $x=[x_{n-N}, x_{n-(N-1)}, \ldots, x_n]$, to provide an output ("filtered signal"), denoted y, e.g., $$y_n = (x * h)_n = \sum\nolimits_{k=0}^{N} h_k x_{n-k}.$$

In some demonstrative aspects, the adaptive filter may include an Infinite Impulse Response (IIR) filter, e.g., as described below.

In one example, an IIR filter having a filter function, which is based on coefficients, denoted a and b, may be applied to an input signal, denoted x, e.g., $x=[x_{n-N}, x_{n-(N-1)}, \ldots, x_n]$, to provide an output ("filtered signal"), denoted y, e.g., $$y_n = \sum\nolimits_{k=0}^{N} b_k x_{n-k} - \sum\nolimits_{r=1}^{M} a_k y_{n-r}.$$

In other aspects, any other additional or alternative type of adaptive filter may be used.

In some demonstrative aspects, AFB mitigator 150 may utilize a Least Mean Squares (LMS) algorithm to adapt one or more parameters of AFB mitigator 150, e.g., as described below.

In some demonstrative aspects, AFB mitigator 150 may adapt one or more parameters of AFB mitigator 150 based on an LMS algorithm, and/or an LMS algorithm variant, e.g., Normalized LMS (NLMS), Leaky LMS, and/or any other LMS-variant.

In other aspects, any other additional or alternative adaptation algorithms may be utilized.

In some demonstrative aspects, AFB mitigator 150 may be configured to provide a technical solution to support implementation of an adaptive AFB mitigator utilizing an LMS algorithm and/or an LMS algorithm variant, e.g., NLMS, Leaky LMS, and/or any other LMS-variant, e.g., as described below.

For example, when implementing some LMS algorithms, there may be a requirement that a desired signal at an output of a filter and an input of the filter should be uncorrelated, for example, in order to achieve convergence.

In some demonstrative aspects, there may be a need for a technical solution to support implementation of an ANC system utilizing adaptive FBC, for example, even in case the acoustic transducer (loudspeaker) output and the reference sensor (microphone) are correlated, e.g., even highly correlated.

In some demonstrative aspects, AFB mitigator 150 may be configured to adapt to changes in an acoustic medium between an acoustic transducer of AAC system 100, e.g., acoustic transducer 108, and an acoustic sensor of the AAC system 100, e.g., reference noise sensor 119 and/or residual-noise sensor 121, for example, even if the output of acoustic transducer 108 and the input to the acoustic sensor, e.g., reference noise sensor 119 and/or residual-noise sensor 121, are correlated, e.g., as described below.

In some demonstrative aspects, AFB mitigator 150 may include a first filter 152 configured to generate a first filtered signal, for example, by filtering a first input signal, e.g., as described below.

In some demonstrative aspects, the first input signal may be based on a first acoustic pattern ("transducer acoustic pattern"), for example, a sound control pattern, e.g., sound control pattern 109, to be output by the acoustic transducer 108, e.g., as described below.

In some demonstrative aspects, the first filter 152 may be configured to generate the first filtered signal, for example, by filtering the first input signal, for example, according to and/or based on a first filter function, e.g., as described below.

In some demonstrative aspects, AFB mitigator 150 may include a second filter 154 configured to generate a second filtered signal, for example, by filtering the first input signal, for example, according to and/or based on a second filter function, e.g., as described below.

In some demonstrative aspects, the second filter 154 may include an adaptive filter, e.g., as described below.

In some demonstrative aspects, the second filter 154 may be adapted, for example, based on a difference between an AFB-mitigated signal and the second filtered signal, e.g., as described below.

In some demonstrative aspects, the AFB-mitigated signal may be based on a difference between a second input signal and the first filtered signal, e.g., as described below.

In some demonstrative aspects, the second input signal may be based on a second acoustic pattern ("sensor acoustic pattern"), which may be sensed by the acoustic sensor, e.g., acoustic noise sensed by the acoustic sensor 119 and/or by residual-noise sensor 121, e.g., as described below.

In some demonstrative aspects, the first filter 152 may be configured to generate the first filtered signal including a first estimation of the AFB, e.g., between acoustic transducer 108 and the acoustic sensor, e.g., reference noise sensor 119 and/or residual-noise sensor 121, e.g., as described below.

In some demonstrative aspects, the second filter 154 may be configured to generate the second filtered signal including second estimation of the AFB, e.g., between acoustic transducer 108 and the acoustic sensor, e.g., reference noise sensor 119 and/or residual-noise sensor 121, e.g., as described below.

In some demonstrative aspects, the second filter 154 may be configured to generate the second filtered signal based on a change in the AFB, e.g., between acoustic transducer 108 and the acoustic sensor, e.g., reference noise sensor 119 and/or residual-noise sensor 121, e.g., as described below.

In some demonstrative aspects, controller 193 may include a Prediction Filter (PF) 156, e.g., as described below.

In some demonstrative aspects, PF 156 may be configured to generate a PF output, for example, based on a PF input, e.g., as described below.

In some demonstrative aspects, PF 156 may be configured to generate the PF output, for example, based on the PF input and an acoustic configuration between the acoustic transducer 108 and the sound control zone 110, e.g., as described below. In other aspects, PF 156 may be configured to generate the PF output based on any other additional or alternative parameters and/or criteria.

In some demonstrative aspects, the PF input of PF 156 may be based on the AFB-mitigated signal provided by AFB mitigator 150, e.g., as described below.

In some demonstrative aspects, the sound control pattern 109 may be based on the PF output of PF 156.

In some demonstrative aspects, the sound control pattern 109 may be based on a combination of the PF output of PF 156 and at least one of an audio signal and/or a voice signal, which are to be heard, for example, in the sound control zone 110.

In some aspects, the sound control pattern 109 may be based directly, or may include only, the PF output of PF 156.

In other aspects, the sound control pattern 109 may be based on any other combination of the PF output of PF 156 with any other audio and/or sound pattern or signal.

In some demonstrative aspects, the second filter 154 may be adapted based on an Least Mean Squares (LMS) algorithm and/or an LMS algorithm variant, e.g., NLMS, Leaky LMS, and/or any other LMS-variant, e.g., as described below.

In other aspects, the second filter 154 may be adapted based on any other additional or alternative adaptation algorithm.

In some demonstrative aspects, at least one of the first filter 152 and/or the second filter 154 may include a FIR filter, e.g., as described below.

In some demonstrative aspects, at least one of the first filter 152 and/or the second filter 154 may include an IIR filter, e.g., as described below.

In other aspects, any other type of filter may be utilized by filter 152 and/or filter 154.

In some demonstrative aspects, the first filter 152 may include a fixed filter having a fixed filter function, e.g., as described below.

In some demonstrative aspects, the fixed filter function of filter 152 may be based on a predefined acoustic configuration between the acoustic transducer 108 and the acoustic sensor, e.g., reference noise sensor 119 and/or residual-noise sensor 121, e.g., as described below.

In some demonstrative aspects, AFB mitigator 150 may be configured to support a technical solution enabling the use of a filter, e.g., filter 152, which may be different from a filter, e.g., filter 154, which may be utilized by an adaptation block of the AFB mitigator 150, e.g., as described below.

In some demonstrative aspects, a filter length of filter 152 may be different from a filter length of filter 154.

In one example, the filter length of filter 152 may be longer than the filter length of filter 154.

In another example, the filter length of filter 152 may be shorter than the filter length of filter 154.

In other aspects, filters 152 and 154 may have a same filter length.

In some demonstrative aspects, a filter architecture of filter 152 may be different from a filter architecture of filter 154.

In other aspects, filter 152 and filter 154 may have a same filter architecture.

In some demonstrative aspects, implementing the filter 152 using a fixed filter may provide a technical solution, for example, in terms of reduced memory, processing, and/or complexity. For example, filter adaptation may consume more memory and/or processing resources, e.g., compared to fixed filtering processing.

In some demonstrative aspects, for example, in some implementations, and/or use cases, filter 152 may be configured to utilize a relatively longer fixed filter, e.g., compared to a length of filter 154, for example, to better represent a predefined filter. For example, the fixed filter may be "fine-tuned", for example, using filter 154 configured to have a lower filter order and/or different architecture. For example, this implementation may provide a technical solution to reduce processing and/or memory needs for the adaptation block. Accordingly, this implementation may provide a technical solution to yield improved total system processing and/or memory needs.

In some demonstrative aspects, for example, in some implementations, and/or use cases, filter 152 may be configured to utilize a relatively short fixed filter, e.g., compared to a length of filter 154. For example, implementation of a relatively short fixed filter 152 may be suitable for relatively narrow-band ANC systems, e.g., with a band of up to 300*hz*, and/or any other suitable AAC implementations. For example, this implementation may provide a technical solution utilizing a relatively short, e.g., low-cost, fixed filter 152. For example, a higher-order or more complex/expensive filter architecture may be utilized for the filter 154 of the adaptation block. In one example, the filter 154 may include a higher order FIR, e.g., compared to short order IIRs and/or second order digital IIRs (biquads).

In some demonstrative aspects, AFB mitigator 150 may be configured to utilize the filters 152 and 154 to provide a technical solution to support estimation of the feedback canceller into two filter stages, e.g., as described below.

In some demonstrative aspects, filter 152 may be implemented using a fixed filter, which may be calibrated and/or pre-tuned. e.g., during a calibration process, for example, with respect to a predefined acoustic configuration between acoustic transducer 108 and the acoustic sensor, e.g., reference noise sensor 119 and/or residual-noise sensor 121.

In one example, filter 152 may be implemented using an IIR, e.g., with a length in the order of (2-20).

In another example, filter 152 may be implemented using cascaded IIRs, e.g., 1-10 cascaded biquads.

In another example, filter 152 may be implemented using a FIR filter, e.g., with a length in the order of (10-1000).

In other aspects, filter 152 may be implemented using any other type of filter.

In some demonstrative aspects, filter 154 may be implemented using an adaptive filter configured to continually adapt to changes of the acoustic feedback, e.g., as described below.

In some demonstrative aspects, filter 154 may be implemented using a short adaptive filter, e.g., a short adaptive FIR filter, for example, with a length in the order of (10-100).

In one example, filter 154 may be adapted for a predefined period, e.g., 1-120 seconds or any other period, followed by a freeze of the adaptation.

In other aspects, filter 154 may be implemented using any other type of adaptive filter.

Figure 3:
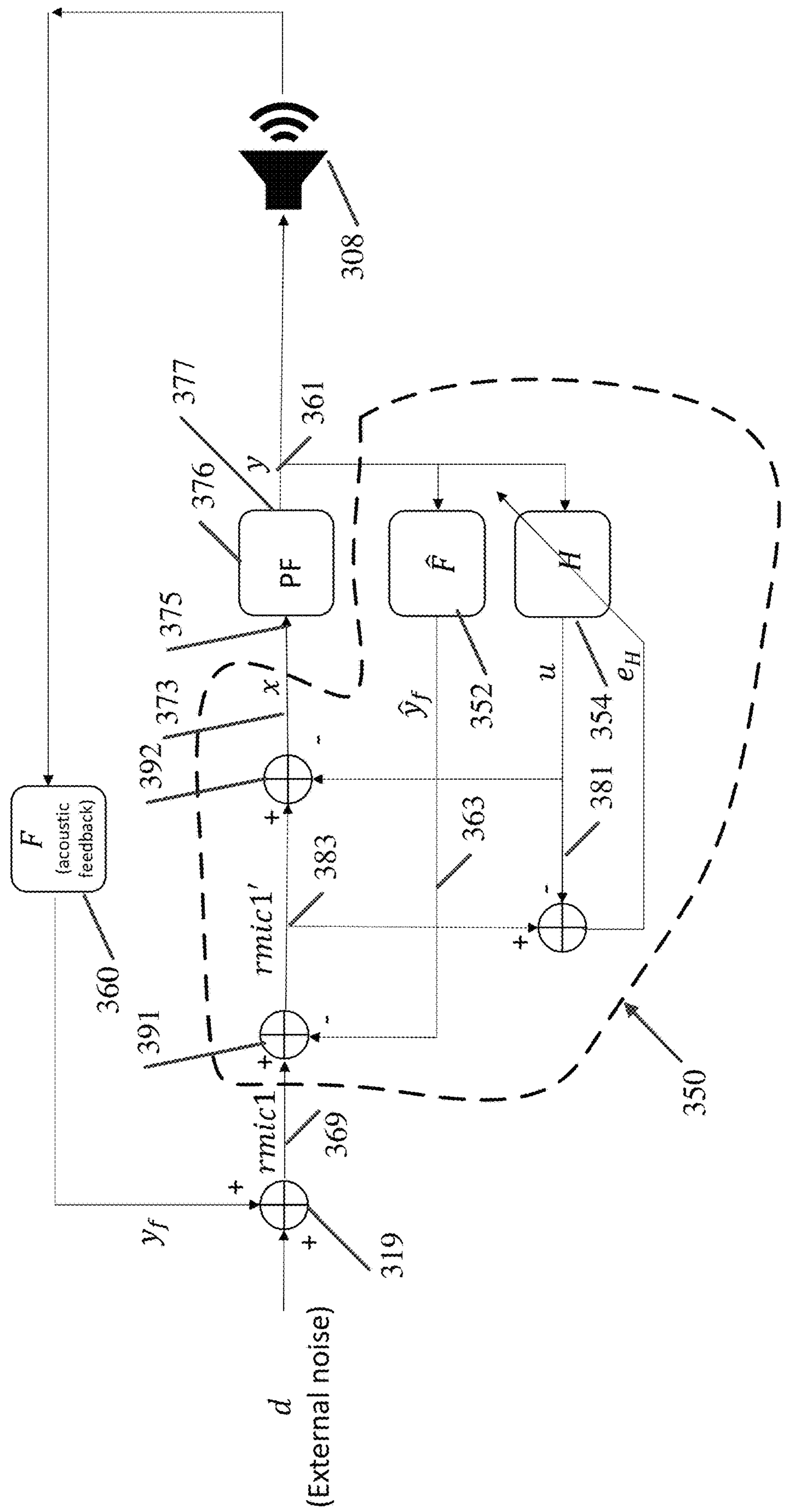
FIG. 3 is a schematic block diagram illustration of an adaptive Acoustic Feedback (AFB) mitigator implemented in an AAC system, in accordance with some demonstrative aspects.

Reference is made to FIG. 3, which schematically illustrates an adaptive AFB mitigator 350 implemented in an AAC system, in accordance with some demonstrative aspects. For example, AFB mitigator 150 (FIG. 1) may include one or more elements of, and/or perform one or more functionalities of, adaptive AFB mitigator 350.

In some demonstrative aspects, AFB mitigator 350 may be configured to mitigate acoustic feedback 360 between an acoustic transducer 308 and an acoustic sensor 319, for example, a reference noise sensor and/or an error noise sensor in the AAC system, e.g., as described below. In one example, acoustic transducer 308 may include acoustic transducer 108 (FIG. 1), and/or acoustic sensor 319 may include reference noise sensor 119 (FIG. 1) or residual noise sensor 121 (FIG. 1).

In other aspects, one or more, e.g., some or all, elements of AFB mitigator 350 may be implemented by, and/or configured to mitigate acoustic feedback for, any other device and/or system, e.g., as described below.

In some demonstrative aspects, AFB mitigator 350 may include a first filter 352 configured to generate a first filtered signal 363 by filtering a first input signal 361, for example, according to and/or based on a first filter function, e.g., as described below.

In some demonstrative aspects, the first input signal 361 may be based on a transducer acoustic pattern to be output by the transducer 308, e.g., as described below.

In some demonstrative aspects, the first input signal 361 may be based on a sound control pattern to be output by the acoustic transducer 308, e.g., as described below.

In other aspects, the first input signal 361 may be based on any other type of transducer acoustic pattern to be output by the transducer 308. In one example, the first input signal 361 may be based on, or may include, an audio signal to be output by the transducer 308.

In some demonstrative aspects, the AAC system may include a PF 376, which may be configured to generate a PF output 377 based on a PF input 375.

In some demonstrative aspects, PF 376 may be configured to generate PF output 377, for example, based on PF input 375, and an acoustic configuration between the acoustic transducer 308 and an acoustic control zone of the AAC system, e.g., acoustic control zone 110 (FIG. 2). In other aspects, PF 376 may be configured to generate PF output 377 based on any other additional or alternative parameters and/or criteria.

In some demonstrative aspects, the sound control pattern to be output by the acoustic transducer 308 may be based on the PF output 377.

In some demonstrative aspects, the first input signal 361 may be based on the PF output 377.

In some demonstrative aspects, the first input signal 361 may include the PF output 377, e.g., as described below.

In other aspects, the first input signal 361 may be based on the PF output 377 and one or more audio and/or voice signals, e.g., as described below.

In some demonstrative aspects, AFB mitigator 350 may include a second filter 354 configured to generate a second filtered signal 381, for example, by filtering the first input signal 361, for example, according to and/or based on a second filter function, e.g., as described below.

In some demonstrative aspects, the second filter 354 may include an adaptive filter, e.g., as described below.

In some demonstrative aspects, the second filter 354 may be adapted, for example, based on a difference between an AFB-mitigated signal 383 and the second filtered signal 381, e.g., as described below.

In some demonstrative aspects, the AFB-mitigated signal 383 may be based on a difference between a second input signal 369 and the first filtered signal 363, e.g., as described below.

In some demonstrative aspects, the second input signal 369 may be based on a sensor acoustic pattern sensed by the acoustic sensor 319, e.g., as described below.

In some demonstrative aspects, the second input signal 369 may be based on an acoustic noise sensed by the acoustic sensor 319, e.g., as described below.

In other aspects, the second input signal 369 may be based on any other type of transducer acoustic pattern sensed by the acoustic sensor 319. In one example, the second input signal 369 may be based on, or may include, audio, voice, noise, or the like, which may be sensed in an environment of the acoustic sensor 319.

In some demonstrative aspects, the first filter 352 may be configured to generate the first filtered signal 363 including a first estimation of the AFB 360, e.g., between acoustic transducer 308 and acoustic sensor 319, e.g., as described below.

In some demonstrative aspects, the second filter 354 may be configured to generate the second filtered signal 381 including a second estimation of the AFB 360, e.g., between acoustic transducer 308 and acoustic sensor 319, e.g., as described below.

In some demonstrative aspects, the second filter 354 may be configured to generate the second filtered signal 381 based on a change in the AFB 360, e.g., between acoustic transducer 308 and acoustic sensor 319, e.g., as described below.

In some demonstrative aspects, the first filter 352 may include a fixed filter having a fixed filter function, e.g., as described below.

In some demonstrative aspects, the first filter 352 may include a fixed IIR filter, e.g., as described below.

In other aspects, the first filter 352 may include a fixed FIR filter, or any other type of fixed filter.

In some demonstrative aspects, the fixed filter function of filter 352 may be based, for example, on a predefined acoustic configuration between the acoustic transducer 308 and the acoustic sensor 319.

In some demonstrative aspects, AFB mitigator 350 may include a first subtractor 391 to generate a first AFB-mitigated signal 383, for example, by subtracting the first filtered signal 363 from the second input signal 369.

In some demonstrative aspects, AFB mitigator 350 may include a second subtractor 392 to generate a second AFB-mitigated signal 373, for example, by subtracting the second filtered signal 381 from the first AFB-mitigated signal 383.

In some demonstrative aspects, the second filter 354 may be adapted based on a difference between the first AFB-mitigated signal 383 and the second filtered signal 381.

In some demonstrative aspects, the PF input 375 may be based on the second AFB-mitigated signal 373.

In some demonstrative aspects, the second filter 354 may be implemented by a short adaptive FIR filter, e.g., as described below.

In other aspects, the second filter 354 may include any other adaptive FIR filter, an adaptive IIR filter, and/or any other adaptive filter.

In some demonstrative aspects, a reference signal ("microphone data signal") picked up by the acoustic sensor 319, denoted rmic1, may be determined by:

$$rmic1[n]=d[n]+y_f[n] \tag{2}$$

wherein d denotes the sensor acoustic pattern sensed by the acoustic sensor 319, e.g., an external noise to be controlled by the AAC system, and wherein:

$$y_f[n]=F*y[n] \tag{3}$$

wherein $y_f[n]$ denotes a feedback component, which is fed-back from the acoustic transducer 308 to the acoustic sensor 319 via the feedback acoustic medium, denoted by F, wherein y denotes the transducer acoustic pattern to be output by the transducer 308, e.g., the sound control pattern ("anti-noise signal" or "cancelling signal") output by the acoustic transducer 308, and * denotes linear convolution.

In some demonstrative aspects, a response, e.g., a desired response, for the adaptive filter 354, denoted H, may be determined as:

$$rmic1'[n]=d[n]+y_f[n]-\hat{y}_f[n] \tag{4}$$

wherein $\hat{y}_f$ denotes an estimate of an "initial" feedback due to the signal y, as may be obtained through the fixed filter 352, denoted $\hat{F}$, wherein:

$$\hat{y}_f[n]=\hat{F}^T y_{L_F}[n] \tag{5}$$

wherein $\hat{F}=[\hat{F}_0, \hat{F}_1, \ldots, \hat{F}_{L_f}]^T$ denotes an impulse response of the filter $\hat{F}$, $L_f$ denotes the length of the filter $\hat{F}$, and wherein $y_{L_f}[n]=[y[n-1], y[n-2], \ldots, y[n-L_f]]^T$ denotes an $L_f$-sample speaker output, which is the input signal vector to the filter $\hat{F}$ (input signal 361).

According to the above definitions and notations, a residual error signal, denoted $e_H[n]$, may be determined, e.g., as follows:

$$e_H[n]=d[n]+y_f[n]-\hat{y}_f[n]-u[n] \tag{6}$$

wherein $u[n]=H[n]^T y_{L_h}[n]$, wherein $H[n]=[H_0[n], H_1[n], \ldots, H_{L_h}[n]]^T$ denotes an impulse response of the filter H, $L_h$ denotes a length of the H, and $y_{L_h}[n]=[y[n-1], y[n-2], \ldots, y[n-L_h]]^T$ denotes an Lh-sample speaker output, which is the input signal vector to the filter H (input signal 361).

In some demonstrative aspects, coefficients of the adaptive filter H may be adapted according to an LMS algorithm and/or an LMS algorithm variant, e.g., NLMS, Leaky LMS, and/or any other LMS-variant, e.g., as described below. In other aspects, any other algorithm may be used.

In some demonstrative aspects, coefficients of the adaptive filter H may be adapted according to the LMS algorithm, e.g., as follows:

$$H[n+1]=H[n]+\mu_h e_H[n] y_{L_h}[n] \tag{7}$$

wherein $\mu_h$ is step size parameter for the adaptive filter H.

In some demonstrative aspects, the signal 373, denoted x, at the PF input 375 of PF 376 may be determined, e.g., as follows:

$$x[n]=d[n]+y_f[n]-\hat{y}_f[n]-u[n] \tag{8}$$

In some demonstrative aspects, when the adaptive filter H converges then, for example, x[n]≈d[n] and, accordingly, the signal x is substantially free of any acoustic feedback component of the signal y, e.g., a noise-cancelling signal for the AAC system.

Referring back to FIG. 1, in some demonstrative aspects, AFB mitigator 150 may be configured to support a technical solution implementing a signal (also referred to as a "virtual signal"), e.g., a predefined or preconfigured signal, which may be internally generated by the AAC system 100, e.g., as described below.

In some demonstrative aspects, AFB mitigator 150 may be configured to support a technical solution utilizing the virtual signal in the process of adaptation of the adaptive filter 154, e.g., as described below.

In some demonstrative aspects, there may be one or more technical issues and/or disadvantages in adding a white noise signal to a speaker output, and using the white noise signal to adapt the AFB mitigator. For example, there may be one or more technical issues and/or disadvantages in injecting white noise into the output of an ANC system, for example, since it may not be desirable to add noise to be heard by the user. This would be in contrast to a concept of emitting from the speakers of an AAC system an output that is based on anti-phase noise to reduce unwanted noises. For example, if noise is added to the output of the speaker in order to adapt the feedback canceller in real time, a user may typically hear that added noise. This added noise may also result in reduced ANC performance, e.g., the AAC system may enhance noise at the ears of the user, e.g., instead of reducing the heard noise at the ear positions.

In some demonstrative aspects, AFB mitigator 150 may be configured to support a technical solution using an internally generated signal for enhancing performance of the AFB mitigator, for example, even without adding a white noise signal to the loudspeaker output which can be heard by the user, e.g., as described below.

In some demonstrative aspects, AFB mitigator 150 may be configured to support a technical solution using an internally generated signal for enhancing performance of the AFB mitigator, for example, while avoiding a technical problem associated with "playing" the white noise.

In some demonstrative aspects, AFB mitigator 150 may be adapted based on an internally generated virtual signal, e.g., as described below.

In some demonstrative aspects, the virtual signal may be used as an additional input to the adaptation block of AFB 150, e.g., as described below.

In some demonstrative aspects, an estimation of the convolution of the virtual signal with the AFB may be added to the signal from the reference microphone 119, e.g., as described below.

In some demonstrative aspects, the internally generated virtual signal may be configured as a noise signal, e.g., a white noise signal, or a pink noise signal. In one example, the internally generated virtual signal may be configured as noise signal with one or more predefined frequency ranges and spectrum, e.g., 100 hz and above, 200-1000 hz, and/or any other range to be used to further optimize the adaptation of the feedback canceller.

In other aspects, the internally generated virtual signal may be configured as any other predefined signal according to any other parameters and/or criteria.

In some demonstrative aspects, the first filter 152 may include an adaptive filter, e.g., as described below.

In some demonstrative aspects, the virtual signal may be utilized to adapt the first filter 152, e.g., as described below.

In some demonstrative aspects, coefficients of the filter 152 may be adapted based on with the predefined internally generated virtual signal, e.g., as described below.

In some demonstrative aspects, the virtual signal may be configured to provide a technical solution to support further optimizing of the AFB mitigator 150, for example, with one or more frequency bands, e.g., on top of the adaptation of the filter 154.

For example, the virtual signal may support further optimization of the AFB mitigator 150, for example, in case where the sound control pattern 109, e.g., the signal y, which is used as the input to the filter 152 and/or filter 154, does not have and/or does not cover all the frequency ranges and/or enough signal energy at those frequencies e.g., to reduce all the acoustic feedback heard by the microphones from the speaker/s.

Figure 4:
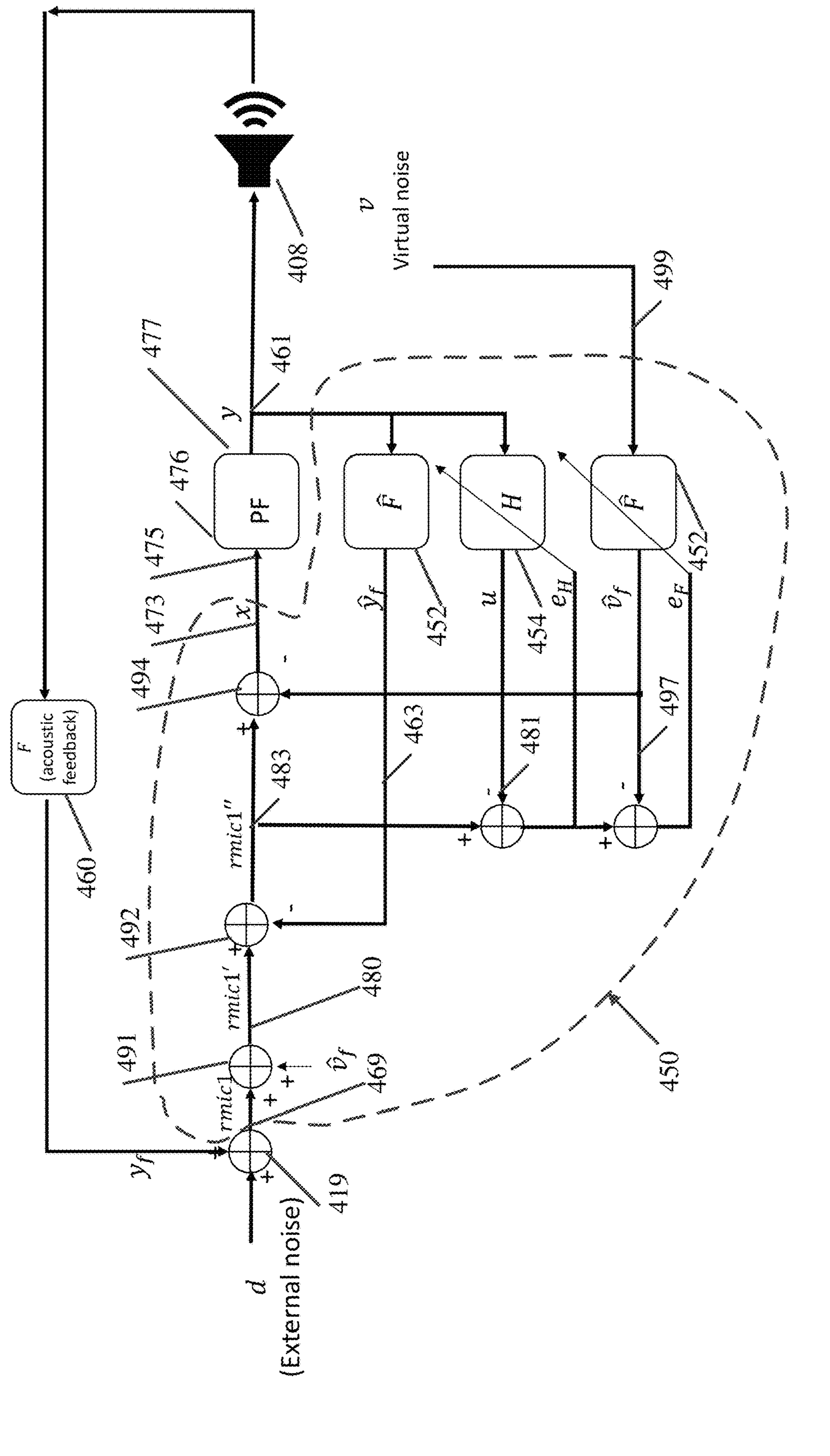
FIG. 4 is a schematic block diagram illustration of an adaptive AFB mitigator implemented in an AAC system, in accordance with some demonstrative aspects.

Reference is made to FIG. 4, which schematically illustrates an adaptive AFB mitigator 450 implemented in an AAC system, in accordance with some demonstrative aspects. For example, AFB mitigator 150 (FIG. 1) may include one or more elements of, and/or perform one or more functionalities of, adaptive AFB mitigator 450.

In some demonstrative aspects, AFB mitigator 450 may be configured to mitigate acoustic feedback 460 between an acoustic transducer 408 and an acoustic sensor 419, for example, a reference noise sensor and/or an error noise sensor in the AAC system, e.g., as described below. In one example, acoustic transducer 408 may include acoustic transducer 108 (FIG. 1), and/or acoustic sensor 419 may include reference noise sensor 119 (FIG. 1) or residual noise sensor 121 (FIG. 1).

In other aspects, one or more, e.g., some or all, elements of AFB mitigator 450 may be implemented by, and/or configured to mitigate acoustic feedback for, any other device and/or system, e.g., as described below.

In some demonstrative aspects, AFB mitigator 450 may include a first filter 452 configured to generate a first filtered signal 463 by filtering a first input signal 461, for example, according to and/or based on a first filter function, e.g., as described below.

In some demonstrative aspects, the first input signal 461 may be based on a transducer acoustic pattern to be output by the transducer 408, e.g., as described below.

In some demonstrative aspects, the first input signal 461 may be based on a sound control pattern to be output by the acoustic transducer 408, e.g., as described below.

In other aspects, the first input signal 461 may be based on any other type of transducer acoustic pattern to be output by the transducer 408. In one example, the first input signal 461 may be based on, or may include, an audio signal to be output by the transducer 408.

In some demonstrative aspects, the AAC system may include a PF 476, which may be configured to generate a PF output 477 based on a PF input 475.

In some demonstrative aspects, PF 476 may be configured to generate PF output 477, for example, based on PF input 475 and an acoustic configuration between the acoustic transducer 408 and a sound controlled zone of the AAC system, e.g., sound controlled zone 110 (FIG. 2). In other aspects, PF 476 may be configured to generate PF output 477 based on any other additional or alternative parameters and/or criteria.

In some demonstrative aspects, the sound control pattern to be output by the acoustic transducer 408 may be based on the PF output 477.

In some demonstrative aspects, the first input signal 461 may be based on the PF output 477.

In some demonstrative aspects, the first input signal 461 may include the PF output 477, e.g., as described below.

In other aspects, the first input signal 461 may be based on the PF output 477 and one or more audio and/or voice signals, for example, audio and/or voice signals to be heard in the sound control zone of the AAC system.

In some demonstrative aspects, AFB mitigator 450 may include a second filter 454 configured to generate a second filtered signal 481, for example, by filtering the first input signal 461, for example, according to and/or based on a second filter function, e.g., as described below.

In some demonstrative aspects, the second filter 454 may include an adaptive filter, e.g., as described below.

In some demonstrative aspects, the second filter 454 may be adapted, for example, based on a difference between an AFB-mitigated signal 483 and the second filtered signal 481, e.g., as described below.

In some demonstrative aspects, the AFB-mitigated signal 483 may be based on a difference between a second input signal 469 and the first filtered signal 463, e.g., as described below.

In some demonstrative aspects, the second input signal 469 may be based on a sensor acoustic pattern sensed by the acoustic sensor 419, e.g., as described below.

In some demonstrative aspects, the second input signal 369 may be based on an acoustic noise sensed by the acoustic sensor 419, e.g., as described below.

In other aspects, the second input signal 469 may be based on any other type of transducer acoustic pattern sensed by the acoustic sensor 419. In one example, the second input signal 469 may be based on, or may include, audio, voice, noise, or the like, which may be sensed in an environment of the acoustic sensor 419.

In some demonstrative aspects, the first filter 452 may be configured to generate the first filtered signal 463 including a first estimation of the AFB 460, e.g., between acoustic transducer 408 and acoustic sensor 419, e.g., as described below.

In some demonstrative aspects, the second filter 454 may be configured to generate the second filtered signal 481 including a second estimation of the AFB 460, e.g., between acoustic transducer 408 and acoustic sensor 419, e.g., as described below.

In some demonstrative aspects, the second filter 454 may be configured to generate the second filtered signal 481 based on a change in the AFB 460, e.g., between acoustic transducer 408 and acoustic sensor 419, e.g., as described below.

In some demonstrative aspects, the first filter 452 may include an adaptive filter, which may be adapted based on a predefined (virtual) signal 499, e.g., as described below.

In some demonstrative aspects, the predefined signal 499 may include a virtual signal, which may be internally generated, e.g., by the AFB mitigator 450 and/or by any other element of a system, e.g., the AAC system, utilizing the AFB mitigator 450.

In some demonstrative aspects, the predefined signal 499 may include a virtual noise signal.

In some demonstrative aspects, the predefined signal 499 may include a virtual white noise signal.

In some demonstrative aspects, the predefined signal 499 may include a virtual pink noise signal.

In some demonstrative aspects, a frequency spectrum of the predefined signal 499 may be different from a frequency spectrum of the first input signal 461.

In other aspects, the predefined signal 499 may include any other type of predefined signal.

In some demonstrative aspects, the first filter 452 may be adapted, for example, based on a subtraction of a filtered predefined signal 497 from the difference between the AFB-mitigated signal 483 and the second filtered signal 481. For example, as shown in FIG. 4, the filtered predefined signal 497 may include the predefined signal 499 filtered by the first filter 452.

In some demonstrative aspects, AFB mitigator 450 may include an adder 491 to generate a modified sensor signal 480, for example, by adding the filtered predefined signal 497 to the second input signal 469.

In some demonstrative aspects, AFB mitigator 450 may include a first subtractor 492 to generate a first AFB-mitigated signal 483, for example, by subtracting the first filtered signal 463 from the modified sensor signal 480. For example. As shown in FIG. 4, the second filter 454 may be adapted based on a difference between the first AFB-mitigated signal 483 and the second filtered signal 481.

In some demonstrative aspects, AFB mitigator 450 may include a second subtractor 494 to generate a second AFB-mitigated signal 473, for example, by subtracting the filtered predefined signal 497 from the first AFB-mitigated signal 483.

In some demonstrative aspects, the PF input 475 may be based on the second AFB-mitigated signal 473.

In some demonstrative aspects, a reference signal ("microphone data signal") picked up by the acoustic sensor 419, denoted rmic1, may be determined by Equations 2 and 3.

In some demonstrative aspects, the adaptive filter 452, denoted $\hat{F}$, may be configured to estimate the AFB 460 affecting the speaker output, denoted y (e.g., the anti-noise signal).

In some demonstrative aspects, the modified sensor signal 480, denoted rmic1'[n], may be determined, for example, by adding $\hat{v}_f[n]$ to rmic1[n], wherein $\hat{v}_f[n]=\hat{f}[n]^T v_{L_f}[n]$, $\hat{F}[n]=[\hat{F}_0[n], \hat{F}_1[n], \ldots, \hat{F}_{L_f}[n]]^T$ denotes the impulse response of the filter $\hat{F}[n]$, $L_f$ is length of the filter $\hat{F}$, and $v_{L_f}[n]=[v[n-1], v[n-2], \ldots, v[n-L_f]]^T$ is the $L_f$-sample predefined (e.g., white noise) signal vector 499, which is the input signal vector to the filter $\hat{F}$ (signal 499).

In some demonstrative aspects, the adaptive filter 454, denoted H, may be configured to mitigate a disturbance from the desired response of the acoustic feedback.

In some demonstrative aspects, a response, e.g., a desired response, for the adaptive H, may be determined, e.g., as follows:

$$r\text{mic}1''[n]=d[n]+y_f[n]+\hat{v}_f[n]-\hat{y}_f[n] \tag{9}$$

wherein $\hat{y}_f$ denotes an estimate of the feedback due, for example, to the transducer acoustic pattern y to be output by the transducer 408, e.g., the anti-noise signal, obtained through the filter $\hat{F}[n]$. For example, If may be determined as follows:

$$\hat{y}_f[n]=\hat{F}[n]^T y_{L_f}[n] \tag{10}$$

wherein $y_{L_f}[n]=[y[n-1], y[n-2], \ldots, y[n-L_f]]^T$ denotes an $L_f$-sample speaker output, which is the input signal vector to the filter $\hat{F}$ (input signal 461).

In some demonstrative aspects, a residual error signal, denoted $e_H[n]$, may be determined, e.g., as follows:

$$e_H[n]=d[n]+y_f[n]+\hat{v}_f[n]-\hat{y}_f[n]-u[n] \tag{11}$$

wherein u[n] denotes an output of the filter H (signal 481).

For example, the signal 481 may be determined, e.g., as follows:

$$u[n]=H[n]^T y_{L_h}[n] \tag{12}$$

wherein $H[n]=[H_0[n], H_1[n], \ldots, H_{L_h}[n]]^T$ denotes the impulse response of H[n], $L_h$ denotes the length of H, and $y_{L_h}[n]=[y[n-1], y[n-2], \ldots, y[n-L_h]]^T$ denotes an $L_h$-sample speaker output, which is the input signal vector to the filter H (input signal 461).

In some demonstrative aspects, coefficients of the filter H may be updated, for example, using an LMS algorithm and/or an LMS algorithm variant, e.g., NLMS, Leaky LMS, and/or any other LMS-variant, e.g., as described below. In other aspects, any other suitable algorithm may be used.

In some demonstrative aspects, coefficients of the filter H may be updated, for example, using the LMS algorithm, e.g., as follows:

$$H[n+1]=H[n]+\mu_h e_H[n] y_{L_h}[n] \quad (13)$$

wherein $\mu_h$ denotes step size parameter for the filter H.

In some demonstrative aspects, the adaptive filter $\hat{F}$ may be excited by the predefined signal 499, denoted v[n], e.g., random (white) noise or any other predefined signal, to generate the filtered predefined signal 497, denoted $\hat{v}_f[n]$.

In some demonstrative aspects, as shown in Fig, 4, the error signal of the adaptive filter H, e.g., the difference between the signal 483 and the signal 481, may be used as a desired response for the adaptive filter $\hat{F}$.

For example, coefficients of the adaptive filter $\hat{F}$ may be updated according to an LMS algorithm, e.g., as follows:

$$\hat{F}[n+1]=\hat{F}[n]+\mu_f(d[n]+y_f[n]+\hat{v}_f[n]-\hat{y}_f[n]-u[n]-\hat{v}_f[n])v_{L_f}[n]=\hat{F}[n]+\mu_f(d[n]+y_f[n]-\hat{y}_f[n]-u[n])v_{L_f}[n] \quad (14)$$

wherein $\mu_f$ denotes a step size parameter for the adaptive filter $\hat{F}$.

In other aspects, the coefficients of the adaptive filter $\hat{F}$ may be updated according to any other algorithm.

In some demonstrative aspects, after updating the coefficients of the adaptive filter $\hat{F}$, the updated coefficients of the adaptive filter $\hat{F}$ may be copied to the fixed filter $\hat{F}$, for example, taking $y_{L_f}[n]$ as its input.

In some demonstrative aspects, the signal 473, denoted x, at the PF input 475 of PF 476 may be determined, e.g., as follows:

$$x[n]=d[n]+y_f[n]+\hat{v}_f[n]-\hat{y}_f[n]-\hat{v}_f[n]=d[n]+y_f[n]-\hat{y}_f[n] \quad (15)$$

In some demonstrative aspects, when the adaptive filter H converges, then, for example, $u[n]=\rightarrow d[n]+y_f[n]-\hat{y}_f[n] \Rightarrow e_H[n]\approx\hat{v}_f[n]$.

Accordingly, the adaptive filter $\hat{F}$ may receive a desired response substantially free of any disturbance.

In some demonstrative aspects, when the adaptive filter $\hat{F}$ converges, e.g., when $\hat{F}\approx F$, then, e.g., ideally, $\hat{y}_f[n]\approx y_f[n]$. Accordingly, $x[n]\approx d[n]$ may be substantially free of any acoustic feedback component of the transducer acoustic pattern to be output by the transducer 408, e.g., the canceling signal.

Referring back to FIG. 1, in some demonstrative aspects, AFB mitigator 150 may be configured to implement the first filter 152 including a fixed filter, while utilizing the internally generated virtual signal to adapt another filter (not shown in FIG. 1) of AFC mitigator 150, e.g., as described below.

In some demonstrative aspects, AFB mitigator 150 may be configured to implement two adaptive filters, e.g., in addition to the fixed filter 152. For example, the two adaptive filters, e.g., including adaptive filter 154 and another adaptive filter (not shown in FIG. 1) may be utilized to adapt to changes in acoustical feedback path, e.g., due to changes in a configuration of the AAC system 100 and/or in an environment if the AAC system 100.

Figure 5:
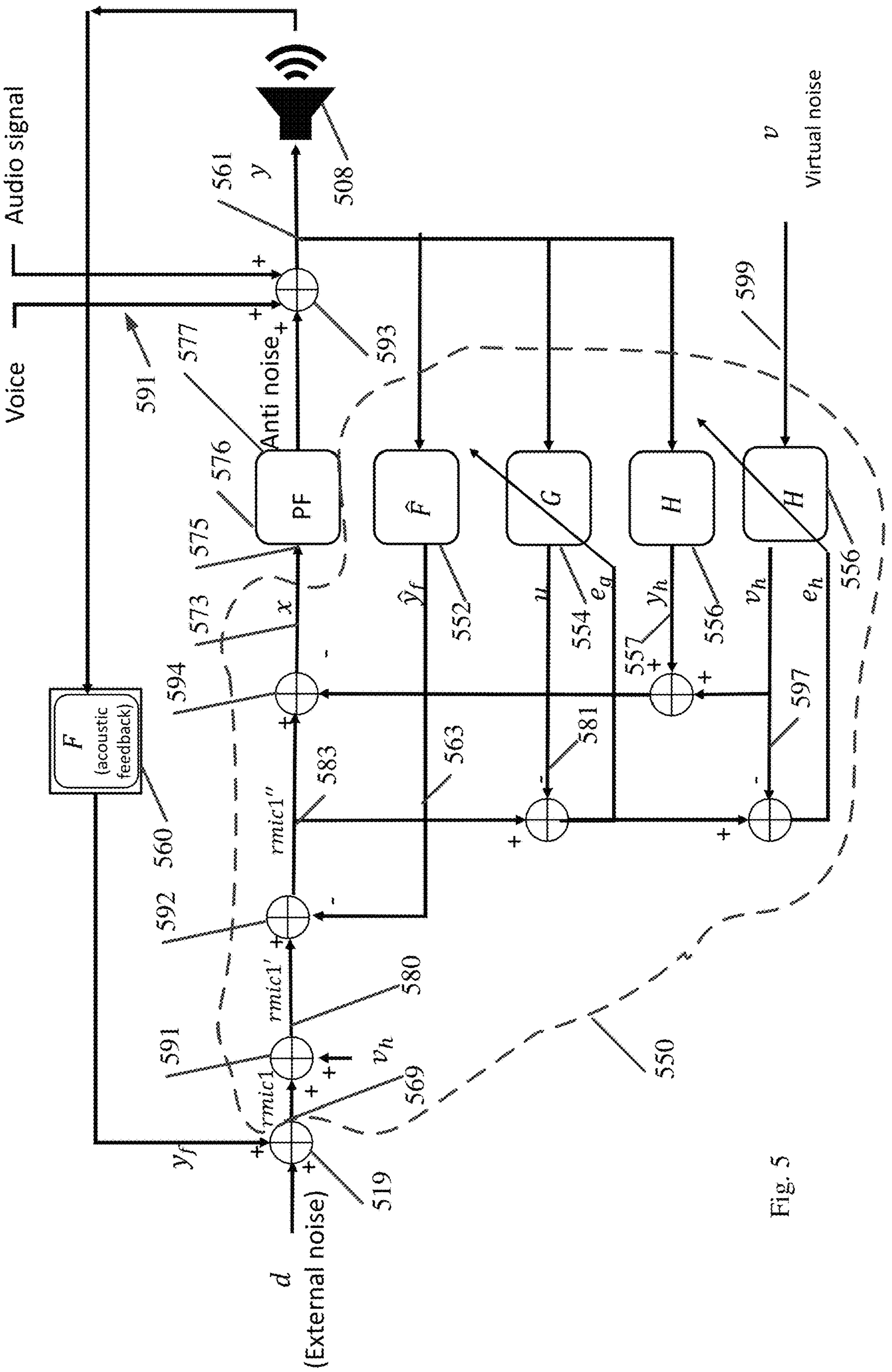
FIG. 5 is a schematic block diagram illustration of an adaptive AFB mitigator implemented in an AAC system, in accordance with some demonstrative aspects.

Reference is made to FIG. 5, which schematically illustrates an adaptive AFB mitigator 550 implemented in an AAC system, in accordance with some demonstrative aspects. For example, AFB mitigator 150 (FIG. 1) may include one or more elements of, and/or perform one or more functionalities of, adaptive AFB mitigator 550.

In some demonstrative aspects, AFB mitigator 550 may be configured to mitigate acoustic feedback 560 between an acoustic transducer 508 and an acoustic sensor 519, for example, a reference noise sensor and/or an error noise sensor in the AAC system, e.g., as described below. In one example, acoustic transducer 508 may include acoustic transducer 108 (FIG. 1), and/or acoustic sensor 519 may include reference noise sensor 119 (FIG. 1) or residual noise sensor 121 (FIG. 1).

In other aspects, one or more, e.g., some or all, elements of AFB mitigator 550 may be implemented by, and/or configured to mitigate acoustic feedback for, any other device and/or system, e.g., as described below.

In some demonstrative aspects, AFB mitigator 550 may include a first filter 552 configured to generate a first filtered signal 563 by filtering a first input signal 561, for example, according to and/or based on a first filter function, e.g., as described below.

In some demonstrative aspects, the first input signal 561 may be based on a transducer acoustic pattern to be output by the transducer 508, e.g., as described below.

In some demonstrative aspects, the first input signal 561 may be based on a sound control pattern to be output by the acoustic transducer 508, e.g., as described below.

In other aspects, the first input signal 561 may be based on any other type of transducer acoustic pattern to be output by the transducer 508. In one example, the first input signal 561 may be based on, or may include, an audio signal to be output by the transducer 508.

In some demonstrative aspects, the AAC system may include a PF 576, which may be configured to generate a PF output 577 based on a PF input 575.

In some demonstrative aspects, PF 576 may be configured to generate PF output 577, for example, based on PF input 575 and an acoustic configuration between the acoustic transducer 508 and an acoustic control zone of the AAC system, e.g., acoustic control zone 110 (FIG. 2). In other aspects, PF 576 may be configured to generate PF output 577 based on any other additional or alternative parameters and/or criteria.

In some demonstrative aspects, the sound control pattern to be output by the acoustic transducer 508 may be based on the PF output 577.

In some demonstrative aspects, the first input signal 561 may be based on the PF output 577.

In some demonstrative aspects, as shown in FIG. 5, the first input signal 561 may be based on the PF output 577 and one or more audio and/or voice signals 591, e.g., as described below.

For example, the AAC system may include a combiner 593 to combine, e.g., a summation unit to sum, a signal based on the PF output 577 with one or more audio and/or voice signals 591.

For example, the one or more audio and/or voice signals 591 may include audio and/or voice signals to be heard in the sound control zone 110 (FIG. 2).

In other aspects, the first input signal 561 may be based on the PF output 577, e.g., while the one or more audio and/or voice signals 591 may be excluded.

In some demonstrative aspects, AFB mitigator 550 may include a second filter 554 configured to generate a second filtered signal 581, for example, by filtering the first input signal 561, for example, according to and/or based on a second filter function, e.g., as described below.

In some demonstrative aspects, the second filter 554 may include an adaptive filter, e.g., as described below.

In some demonstrative aspects, the second filter 554 may be adapted, for example, based on a difference between an AFB-mitigated signal 583 and the second filtered signal 581, e.g., as described below.

In some demonstrative aspects, the AFB-mitigated signal 583 may be based on a difference between a second input signal 569 and the first filtered signal 563, e.g., as described below.

In some demonstrative aspects, the second input signal 569 may be based on a sensor acoustic pattern sensed by the acoustic sensor 519, e.g., as described below.

In some demonstrative aspects, the second input signal 569 may be based on an acoustic noise sensed by the acoustic sensor 519, e.g., as described below.

In other aspects, the second input signal 569 may be based on any other type of transducer acoustic pattern sensed by the acoustic sensor 519. In one example, the second input signal 569 may be based on, or may include, audio, voice, noise, or the like, which may be sensed in an environment of the acoustic sensor 519.

In some demonstrative aspects, the first filter 552 may be configured to generate the first filtered signal 563 including a first estimation of the AFB 560, e.g., between acoustic transducer 508 and acoustic sensor 519, e.g., as described below.

In some demonstrative aspects, the second filter 554 may be configured to generate the second filtered signal 581 including a second estimation of the AFB 560, e.g., between acoustic transducer 508 and acoustic sensor 519, e.g., as described below.

In some demonstrative aspects, the second filter 554 may be configured to generate the second filtered signal 581 based on a change in the AFB 560, e.g., between acoustic transducer 508 and acoustic sensor 519, e.g., as described below.

In some demonstrative aspects, the first filter 552 may include a fixed filter having a fixed filter function, e.g., as described below.

In some demonstrative aspects, the first filter 552 may include a fixed IIR filter, e.g., as described below.

In other aspects, the first filter 552 may include a fixed FIR filter, or any other type of fixed filter.

In some demonstrative aspects, the fixed filter function of filter 552 may be based, for example, on a predefined acoustic configuration between the acoustic transducer 508 and the acoustic sensor 519.

In some demonstrative aspects, the second filter 554 may be implemented by a short adaptive FIR filter, e.g., as described below.

In other aspects, the second filter 554 may include any other adaptive FIR filter, an adaptive IIR filter, and/or any other adaptive filter.

In some demonstrative aspects, AFB mitigator 550 may include a third filter 556 configured to generate a third filtered signal 557, for example, by filtering the first input signal 561, for example, according to and/or based on a third filter function, e.g., as described below.

In some demonstrative aspects, the third filter 556 may include an adaptive filter, e.g., as described below.

In some demonstrative aspects, the third filter 556 may be adapted based on a predefined (virtual) signal 599, e.g., as described below.

In some demonstrative aspects, the predefined signal 599 may include a virtual signal, which may be internally generated, e.g., by the AFB mitigator 550 and/or by any other element of a system, e.g., the AAC system, utilizing the AFB mitigator 550.

In some demonstrative aspects, the predefined signal 599 may include a virtual noise signal.

In some demonstrative aspects, the predefined signal 599 may include a virtual white noise signal.

In some demonstrative aspects, the predefined signal 599 may include a virtual pink noise signal.

In some demonstrative aspects, a frequency spectrum of the predefined signal 599 may be different from a frequency spectrum of the first input signal 561.

In other aspects, the predefined signal 599 may include any other type of predefined signal.

In some demonstrative aspects, the third filter 556 may be adapted, for example, based on a subtraction of a filtered predefined signal 597 from the difference between the AFB-mitigated signal 583 and the second filtered signal 581, e.g., as described below. For example, as shown in FIG. 5, the filtered predefined signal 597 may include the predefined signal 599 filtered by the third filter 556.

In some demonstrative aspects, as shown in FIG. 5, AFB mitigator 550 may be configured according to a multi-filter AFB mitigation architecture utilizing a fixed predefined filter, e.g., the filter 552; an adaptation block based on the speaker/s signals, e.g., filter 554; and an adaptation block based on a virtual internal generated signal, e.g., the filter 556.

For example, the second filter 554, denoted G, may be utilized to remove disturbance from the desired response of the acoustic feedback; and/or the third filter, denoted H, may be utilized to adapt to changes of the AFB.

In some demonstrative aspects, the filter H, may use an input from the virtual internal generated signal 599, for example, to adapt coefficients of the filter H. The adapted coefficients of the filter H may be applied to the input 561, e.g., representing the speaker signals, for example, to estimate signals 557, denoted Yh, to be reduced from the microphone path, e.g., the ANC microphone/s path.

In some demonstrative aspects, AFB mitigator 550 may include an adder 591 to generate a modified sensor signal 580, for example, by adding the filtered predefined signal 597 to the second input signal 569.

In some demonstrative aspects, AFB mitigator 550 may include a first subtractor 592 to generate a first AFB-mitigated signal, e.g., signal 583, for example, by subtracting the first filtered signal 563 from the modified sensor signal 580.

In some demonstrative aspects, AFB mitigator may include a second subtractor 594 to generate a second AFB-mitigated signal 573, for example, by subtracting from the first AFB-mitigated signal 583 a sum of filtered signals. For example, as shown in FIG. 5, the sum of filtered signals may include a sum of the third filtered signal 557 and the filtered predefined signal 597.

In some demonstrative aspects, the PF input 575 may be based on the second AFB-mitigated signal 573.

In some demonstrative aspects, a reference signal ("microphone data signal") picked up by the acoustic sensor 519, denoted rmic1, may be determined by Equations 2 and 3, for example, using y to denote the output by the acoustic transducer 518, e.g., including the combination of the sound control pattern ("anti-noise signal" or "cancelling signal") together with the voice/audio signals 591.

In some demonstrative aspects, the signal 580, denoted rmic1'[n] may be determined, for example, by adding the signal Un [n] to the signal rmic1[n], wherein $v_h[n]=H[n]^T v_{L_h}[n]$, wherein $H[n]=[H_0[n], H_1[n], \ldots, H_{L_h}[n]]^T$ denotes an impulse response of the filter H [n], $L_h$ denotes a length of the filter H, and $v_{L_h}[n]=[v[n-1], v[n-2], \ldots, v[n-L_h]]^T$ denotes an $L_h$-sample predefined signal, e.g., a white noise signal vector (signal 599). For example, the signal $v_{L_h}[n]$ may be used as the input signal vector to the filter H in the adaptation process.

In some demonstrative aspects, a response, e.g., a desired response, for the adaptive filter G may be determined, e.g., as follows:

$$rmic1''[n]=d[n]+y_f[n]+v_h[n]-\hat{y}_f[n], \quad \text{where} \quad \hat{y}_f[n]=\hat{F}[n]^T y_{L_f}[n] \tag{16}$$

wherein $\hat{F}=[\hat{F}_0, \hat{F}_1, \ldots, \hat{F}_{L_f}]^T$ denotes an impulse response of the filter $\hat{F}$, $L_f$ denotes a length of $\hat{F}$, and $y_{L_f}[n]=[y[n-1], y[n-2], \ldots, y[n-L_f]]^T$ denotes an $L_f$-sample speaker output, which is the input signal vector to the filter $\hat{F}$ (input signal 561).

In some demonstrative aspects, a residual error signal, denoted $e_g[n]$, may be determined, e.g., as follows:

$$e_g[n]=d[n]+y_f[n]+v_h[n]-\hat{y}_f[n]-u[n] \tag{17}$$

wherein u[n] denotes an output of the filter G, give as $u[n]=G[n]^T y_{L_g}[n]$ (signal 581), wherein $G[n]=[G_0[n], G_1[n], \ldots, G_{L_g}[n]]^T$ denotes an impulse response of the filter G[n], $L_g$ denotes a length of the filter G, and $y_{L_g}[n]=[y[n-1], y[n-2], \ldots, y[n-L_g]]^T$ denotes an $L_g$-sample speaker output, which is the input signal vector to the filter G (signal 561).

In some demonstrative aspects, coefficients of the filter G may be updated, for example, according to an LMS algorithm and/or an LMS algorithm variant, e.g., NLMS, Leaky LMS, and/or any other LMS-variant, e.g., as described below. In other aspects, any other suitable algorithm may be used.

In some demonstrative aspects, coefficients of the filter G may be updated according to an LMS algorithm, e.g., as follows:

$$G[n+1]=G[n]+\mu_g e_g[n] y_{L_g}[n] \tag{18}$$

wherein $\mu_g$ denotes a step size parameter for the filter G.

In some demonstrative aspects, the adaptive filter H may be excited by the predefined signal v[n], e.g., a random (white) noise.

In some demonstrative aspects, an error signal of the filter G may be used as a desired response for the adaptive filter H.

In some demonstrative aspects, coefficients of the filter H may be updated, for example, according to an LMS algorithm and/or an LMS algorithm variant, e.g., NLMS, Leaky LMS, and/or any other LMS-variant. In other aspects, any other suitable algorithm may be used.

In some demonstrative aspects, coefficients of the filter H may be updated according to an LMS algorithm, e.g., as follows:

$$\begin{aligned} H[n+1] &= \\ &H[n]+\mu_h\big(d[n]+y_f[n]+v_h[n]-\hat{y}_f[n]-u[n]-v_h[n]\big)v_{L_h}[n] = \\ &\qquad H[n]+\mu_H\big(d[n]+y_f[n]-\hat{y}_f[n]-u[n]\big)v_{L_h}[n] \end{aligned} \tag{19}$$

wherein $\mu_h$ denotes a step size parameter for the filter H.

In some demonstrative aspects, after updating the coefficients of the adaptive filter H, the updated coefficients of the adaptive filter H may be copied to the fixed filter H, for example, taking y[n] as its input.

In some demonstrative aspects, the signal 573, denoted x, at the PF input 575 of PF 576 may be determined, e.g., as follows:

$$\begin{aligned} x[n] &= \\ &d[n]+y_f[n]+v_h-\hat{y}_f[n]-v_h[n]-y_h[n] = d[n]+y_f[n]-\hat{y}_f[n]-y_h[n] \end{aligned} \tag{20}$$

wherein $y_h[n]=H[n]^T y_{L_h}[n]$, and $y_{L_h}[n]=[y[n-1], y[n-2], \ldots, y[n-L_h]]^T$ denotes an $L_h$-sample speaker output, which is the input signal vector to the filter H (signal 561).

In some demonstrative aspects, when the adaptive filter G converges, then, for example, $u[n]\rightarrow d[n]+y_f[n]-\hat{y}_f[n] \Rightarrow e_g[n]\approx v_h[n]$.

Accordingly, adaptive filter H may receive a desired response substantially free of any disturbance.

In some demonstrative aspects, when the adaptive filter H converges, then, e.g., ideally, $\hat{y}_f[n]+y_h[n]\approx y_f[n]$. Accordingly, $x[n]\approx d[n]$ may be substantially free of any acoustic feedback component of the transducer acoustic pattern to be output by the transducer 508, e.g., the canceling signal.

Figure 6:
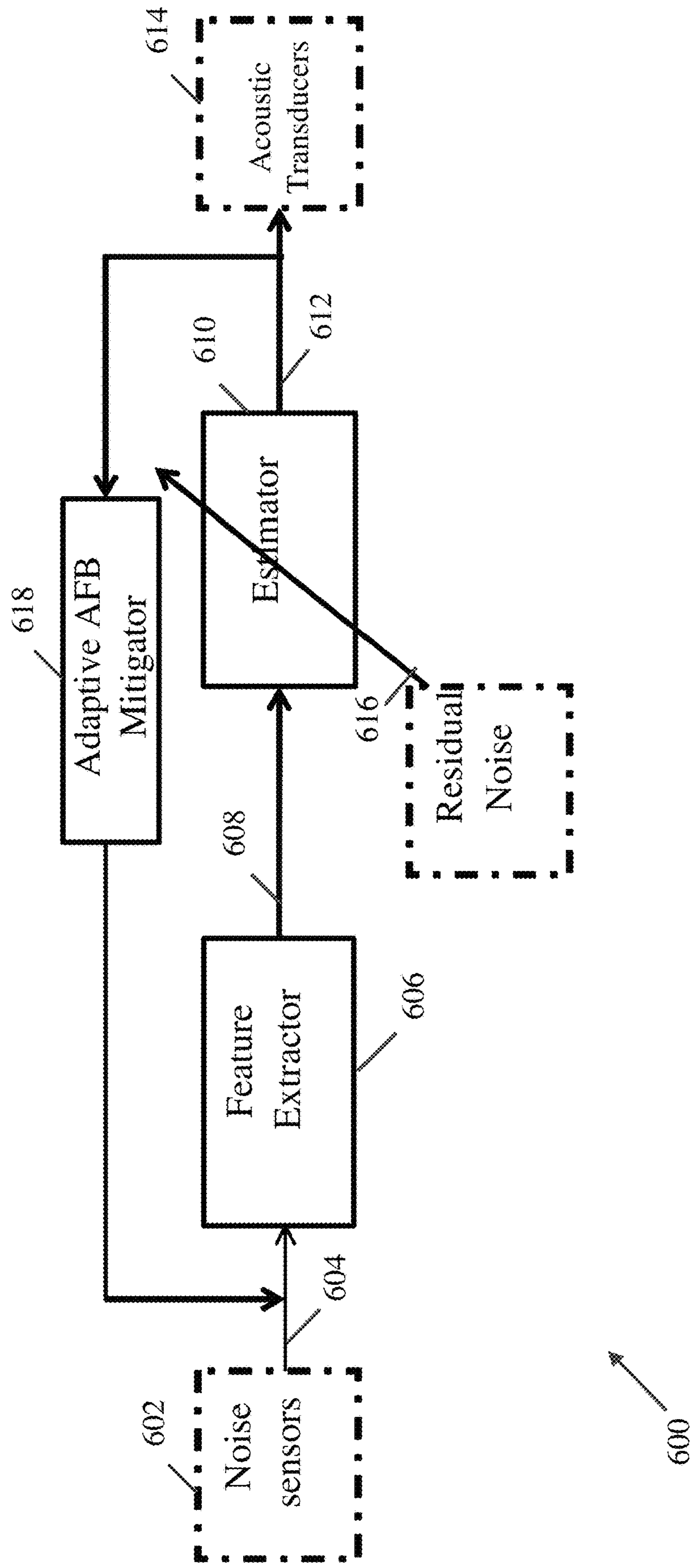
FIG. 6 is a schematic block diagram illustration of a controller implementing AFB mitigation, in accordance with some demonstrative aspects.

Reference is made to FIG. 6, which schematically illustrates a controller 600 implementing AFB mitigation, in accordance with some demonstrative aspects. In some aspects, AAC controller 102 (FIG. 1) and/or controller 193 (FIG. 1) may include one or more elements of, and/or may perform one or more functionalities and/or operations of controller 600.

In some demonstrative aspects, controller 600 may be configured according to a non-hybrid scheme, e.g., as described below.

In some demonstrative aspects, the non-hybrid scheme may include a noise prediction filter, which may be applied to a prediction filter input, which is based on a noise input, e.g., noise input 104 (FIG. 1), as described below.

In some demonstrative aspects, controller 600 may receive a plurality of inputs 604, e.g., including inputs 104 (FIG. 1), from noise sensors 602, representing acoustic noise at a plurality of predefined noise sensing locations, e.g., locations 105 (FIG. 2).

In some demonstrative aspects, controller 600 may generate a sound control signal 612 to control at least one acoustic transducer 614, e.g., acoustic transducer 108 (FIG. 1).

In some demonstrative aspects, controller 600 may include an estimator ("prediction unit") 610 to estimate signal 612 by applying an estimation function to an input 608 corresponding to inputs 604. For example, estimator 610 may include a PF. For example, PF 156 (FIG. 1) may include estimator 610 and/or may perform one or more functionalities of estimator 610.

In some demonstrative aspects, estimator 610 may include a PF implemented using a Finite Impulse Response (FIR) filter.

In some demonstrative aspects, estimator 610 may include a PF implemented using an Infinite Impulse Response (IIR) filter. In one example, estimator 610 may include a PF implemented using a multi-cascaded in serial second order digital IIR filter.

In other aspects, and other prediction filter may be used.

In some demonstrative aspects, controller 600 may include an adaptive AFB mitigator 618, which may be configured to mitigate AFB between acoustic transducer 614 and reference noise acoustic sensors 602.

For example, AFB mitigator 150 (FIG. 1) may include adaptive AFB mitigator 618 and/or may perform one or more functionalities of adaptive AFB mitigator 618.

In some demonstrative aspects, adaptive AFB mitigator 618 may include one or more elements of, and/or perform one or more functionalities of, adaptive AFB mitigator 350 (FIG. 3).

In some demonstrative aspects, adaptive AFB mitigator 618 may include one or more elements of, and/or perform one or more functionalities of, adaptive AFB mitigator 450 (FIG. 4).

In some demonstrative aspects, adaptive AFB mitigator 618 may include one or more elements of, and/or perform one or more functionalities of, adaptive AFB mitigator 550 (FIG. 5).

In some demonstrative aspects, e.g., as shown in FIG. 6, controller 600 may include an extractor 606 to extract a plurality of disjoint reference acoustic patterns from inputs 604. According to these aspects, input 608 may include the plurality of disjoint reference acoustic patterns.

In some demonstrative aspects, controller 600 may generate signal 612 configured to reduce and/or eliminate the noise produced by one or more noise sources, e.g., as described above.

In some demonstrative aspects, controller 600 may generate sound control signal 612 configured to reduce and/or eliminate the noise energy and/or wave amplitude of one or more sound patterns within the sound control zone 110 (FIG. 2), while the noise energy and/or wave amplitude of one or more other sound patterns may not be affected within the sound control zone 110 (FIG. 2).

In other aspects, controller 600 may not include extractor 606. Accordingly, input 608 may include inputs 604 and/or any other input based on inputs 604.

In some demonstrative aspects, estimator 610 may apply any suitable linear and/or non-linear function to input 608. For example, the estimation function may include a non-linear estimation function, e.g., a radial basis function.

In some demonstrative aspects, estimator 610 may be able to adapt one or more parameters of the estimation function based on a plurality of residual-noise inputs 616 representing acoustic residual-noise at a plurality of predefined residual-noise sensing locations, which are located within the noise-control zone. For example, inputs 616 may include inputs 106 (FIG. 1) representing acoustic residual-noise at residual-noise sensing locations 107 (FIG. 2), which may be located within noise-control zone 110 (FIG. 2).

In some demonstrative aspects, one or more of inputs 616 may include at least one virtual microphone input corresponding to a residual noise ("noise error") sensed by at least one virtual error sensor at least one particular residual-noise sensor location of locations 107 (FIG. 2). For example, controller 600 may evaluate the noise error at the particular residual-noise sensor location based on inputs 608 and the predicted noise signal 612, e.g., as described below.

In some demonstrative aspects, estimator 610 may include a multi-input-multi-output (MIMO) prediction unit configured, for example, to generate a plurality of sound control patterns corresponding to the n-th sample, e.g., including M control patterns, denoted $y_1(n) \ldots y_M(n)$, to drive a plurality of M respective acoustic transducers, e.g., based on the inputs 608, e.g., as described below.

Figure 7:
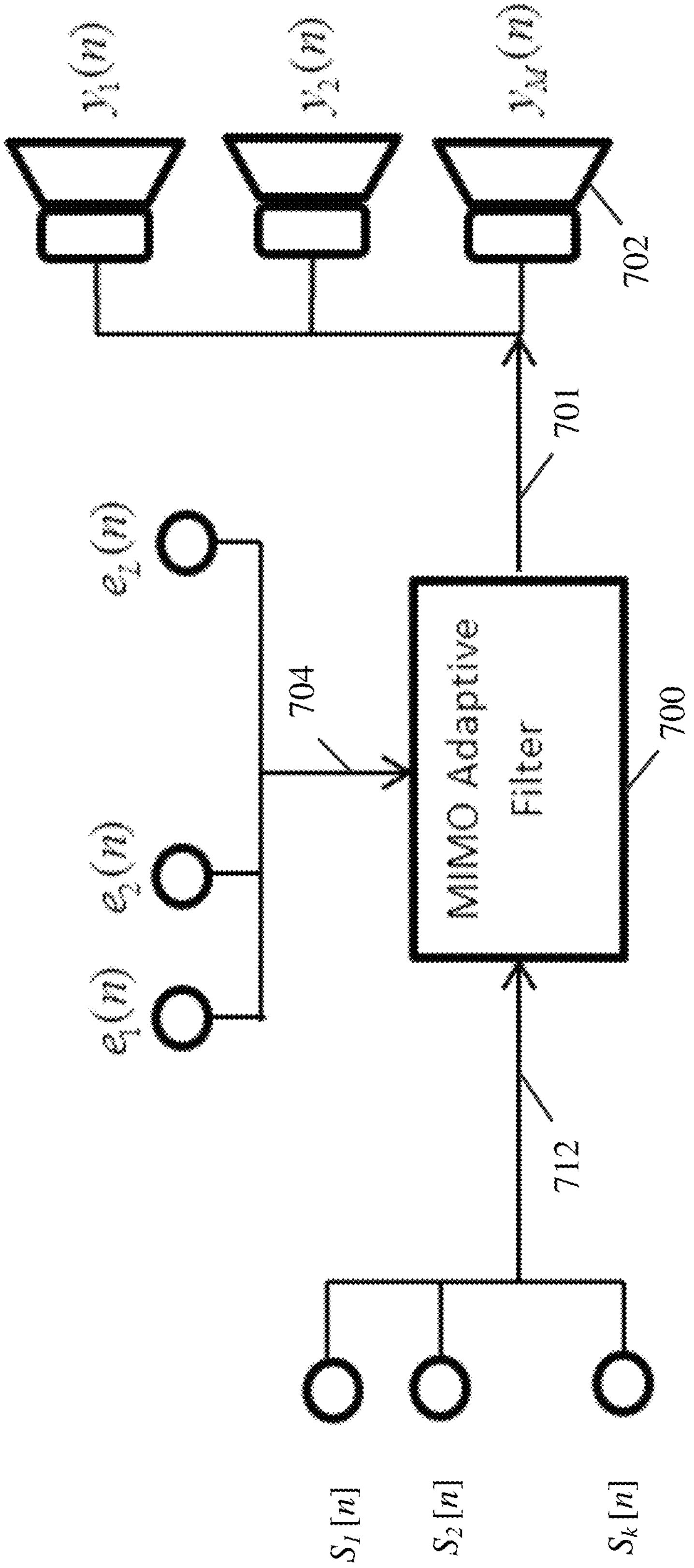
FIG. 7 is a schematic block diagram illustration of a Multiple-Input-Multiple-Output (MIMO) prediction unit, in accordance with some demonstrative aspects.

Reference is now made to FIG. 7, which schematically illustrates a MIMO prediction unit 700, in accordance with some demonstrative aspects. In some demonstrative aspects, estimator 610 (FIG. 6) may include MIMO prediction unit 700, and/or perform one or more functionalities of, and/or operations of, MIMO prediction unit 700.

As shown in FIG. 7, prediction unit 700 may be configured to receive an input 712 including the vector $\hat{S}[n]$, e.g., as output from extractor 606 (FIG. 6), and to drive a loudspeaker array 702 including M acoustic transducers, e.g., acoustic transducers 108 (FIG. 1). For example, prediction unit 700 may generate a controller output 701 including the M sound control patterns $y_1(n) \ldots y_M(n)$, to drive a plurality of M respective acoustic transducers, e.g., acoustic transducers 108 (FIG. 1), for example, based on the inputs 608 (FIG. 6).

In some demonstrative aspects, interference (cross-talk) between two or more of the M acoustic transducers of array 702 may occur, for example, when two or more, e.g., all of, the M acoustic transducers generate the control noise pattern, e.g., simultaneously.

In some demonstrative aspects, prediction unit 700 may generate output 701 configured to control array 702 to generate a substantially optimal sound control pattern, e.g., while simultaneously optimizing the input signals to each speaker in array 702. For example, prediction unit 700 may control the multi-channel speakers of array 702, e.g., while cancelling the interface between the speakers.

In one example, prediction unit 700 may utilize a linear function with memory. For example, prediction unit 700 may determine a sound control pattern, denoted $y_m[n]$, corresponding to an m-th speaker of array 702 with respect to the n-th sample of the sound control pattern, e.g., as follows:

$$y_m[n] = \sum_{k=1}^{K} \sum_{i=1}^{I-1} w_{km}[i] s_k[n-i] \tag{21}$$

wherein $S_k[n]$ denotes the k-th disjoint reference acoustic pattern, e.g., received from extractor 606 (FIG. 6), and $w_{km}[i]$ denotes a prediction filter coefficient configured to drive the m-th speaker based on the k-th disjoint reference acoustic pattern, e.g., as described below.

In another example, prediction unit 700 may implement any other suitable prediction algorithm, e.g., linear, or non-linear, having or not having memory, and the like, to determine the output 701.

In some demonstrative aspects, prediction unit 700 may optimize the prediction filter coefficients $w_{km}[i]$, for example, based on a plurality of residual-noise inputs 704, e.g., including a plurality of residual-noise inputs 616 (FIG. 6). For example, prediction unit 700 may optimize the prediction filter coefficients $w_{km}[i]$, for example, to achieve maximal destructive interference at the residual-error sensing locations 107 (FIG. 2). For example, locations 107 (FIG. 2) may include L locations, and inputs 704 may include L residual noise components, denoted $e_1[n], e_2[n], \ldots, e_L[n]$.

In some demonstrative aspects, prediction unit 700 may optimize one or more of, e.g., some or all of, the prediction filter coefficients $w_{km}[i]$ based, for example, on a minimum mean square error (MMSE) criterion, or any other suitable criteria. For example, a cost function, denoted J, for optimization of one or more, of, e.g., some or all of, the prediction filter coefficients $w_{km}[i]$ may be defined, for example, as a total energy of the residual noise components $e_1[n], e_2[n], \ldots, e_L[n]$ at locations 107 (FIG. 2), e.g., as follows:

$$J = E\left\{\sum_{l=1}^{L} e_l^2[n]\right\} \tag{22}$$

In some demonstrative aspects, a residual noise pattern, denoted $e_l[n]$, at an l-th location may be expressed, for example, as follows:

$$e_l[n] = d_l[n] - \sum_{m=1}^{M}\sum_{j=0}^{J-1} stf_{lm}[j]\cdot y_m[n-j] = d_l[n] - \sum_{m=1}^{M}\sum_{j=0}^{J-1} stf_{lmj}[j]\cdot\sum_{k=1}^{K}\sum_{i=1}^{I-1} w_{km}[i]s_k[n-i] \tag{23}$$

wherein $stf_{lm}[j]$ denotes a path transfer function having J coefficients from the m-th speaker of the array 702 at a l-th location; and $w_{km}[n]$ denotes an adaptive weight vector of the prediction filter with I coefficients representing the relationship between the k-th reference acoustic pattern$S_k[n]$ and the control signal of the m-th speaker.

In some demonstrative aspects, prediction unit 700 may optimize one or more elements of, e.g., some or all elements of, the adaptive weights vector $w_{km}[n]$, e.g., to reach an optimal point, e.g., a maximal noise reduction. For example, prediction unit 700 may implement a gradient based adaptation method, when at each step the weight vector $w_{km}[n]$ is updated in a negative direction of a gradient of the cost function J, e.g., as follows:

$$w_{km}[n+1] = w_{km}[n] - \frac{\mu_{km}}{2}\cdot\nabla J_{km} \tag{24}$$

$$\nabla J_{km} = -2\sum_{l=1}^{L} e_l[n]\sum_{i=1}^{I-1} stf_{km}[n]x_k[n-i]$$

$$w_{km}[n+1] = w_{km}[n] + \mu_{km}\cdot\sum_{l=1}^{L} e_l[n]\sum_{i=1}^{I-1} stf_{km}[n]x_k[n-i]$$

In other aspects, prediction unit 700 may be implemented according to any other prediction scheme and/or utilizing any other additional or alternative prediction algorithms.

Figure 8:
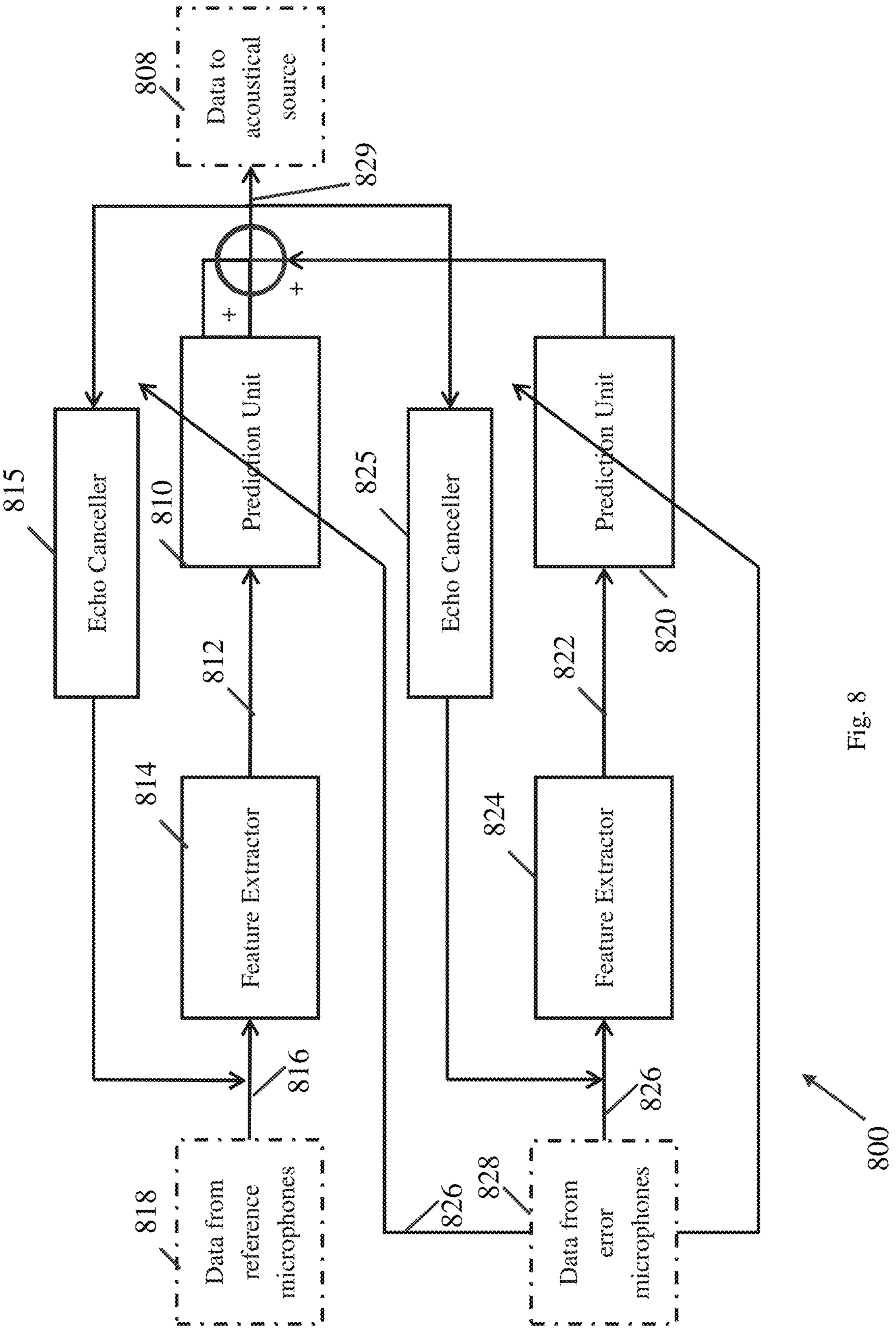
FIG. 8 is a schematic block diagram illustration of a controller implementing AFB mitigation, in accordance with some demonstrative aspects.

Reference is now made to FIG. 8, which schematically illustrates a controller 800 implementing AFB mitigation, in accordance with some demonstrative aspects. For example, controller 193 (FIG. 1) may include one or more elements of controller 800 and/or may perform one or more operations and/or functionalities of controller 800.

In some demonstrative aspects, controller 800 may be configured according to a hybrid scheme, e.g., as described below.

In some demonstrative aspects, the hybrid scheme may be configured to apply at least one noise prediction filter and at least one residual-noise prediction filter, e.g., as described below.

In some demonstrative aspects, the noise prediction filter may be configured to be applied to a prediction filter input, which may be based on a noise input, e.g., as described below.

In some demonstrative aspects, the residual-noise prediction filter may be configured to be applied to a prediction filter input, which may be based on a residual-noise input, e.g., as described below.

In some demonstrative aspects, as shown in FIG. 8, controller 800 may include a prediction filter 810 and a prediction filter 820, e.g., as described below.

In some demonstrative aspects, as shown in FIG. 8, controller 800 may generate a sound control signal 829, e.g., including a predicted noise signal, for example, based on an output of the prediction unit 810 and an output of the prediction unit 820.

In some demonstrative aspects, controller 800 may output the sound control signal 829 to at least one acoustic transducer 808.

In some demonstrative aspects, prediction filter 810 and/or prediction filter 820 may be implemented by a FIR filter.

In other aspects, prediction filter 810 and/or prediction filter 820 may be implemented by an IIR filter. In one example, prediction filter 810 and/or prediction filter 820 may be implemented by a multi-cascaded in serial second order digital IIR biquad filters.

In other aspects, and other prediction filter may be used.

In some demonstrative aspects, as shown in FIG. 8, the prediction filter 810 may include a noise prediction filter to be applied to a prediction filter input 812, which may be based on a noise input 816, for example, from one or more noise sensors 818 ("reference microphones"). For example, the prediction filter input 812 may be based on noise input 104 (FIG. 1).

In some demonstrative aspects, the prediction filter 820 may include a residual-noise prediction filter to be applied to a prediction filter input 822, which may be based on a residual-noise input 826, for example, from one or more residual-noise sensors 828 ("error microphones"). For example, prediction filter input 822 may be based on residual-noise input 106 (FIG. 1).

In some demonstrative aspects, input 826 may include at least one virtual microphone input corresponding to a residual noise ("noise error") sensed by at least one virtual error sensor at virtual sensing location. For example, controller 800 may evaluate the noise error at a virtual sensing location based on input 826 and the sound control signal 829,*e*.g., as described above.

In some demonstrative aspects, controller 800 may generate sound control signal 829, which may be configured to reduce and/or eliminate the noise energy and/or wave amplitude of one or more sound patterns within a sound control zone, while the noise energy and/or wave amplitude of one or more other sound patterns may not be affected within the sound control zone, e.g., as described below.

In some demonstrative aspects, e.g., as shown in FIG. 8, controller 800 may include an extractor 814 to extract a plurality of disjoint reference acoustic patterns from input 816. According to these aspects, prediction filter input 812 may include the plurality of disjoint reference acoustic patterns.

In other aspects, extractor 814 may be excluded, and prediction filter input 812 may be generated directly or indirectly based on input 816, e.g., according to any other algorithm and/or calculation.

In some demonstrative aspects, e.g., as shown in FIG. 8, controller 800 may include an extractor 824 to extract a plurality of disjoint residual-noise acoustic patterns from input 826. According to these aspects, prediction filter input 822 may include the plurality of disjoint residual-noise acoustic patterns.

In other aspects, extractor 824 may be excluded, and prediction filter input 822 may be generated, directly or indirectly, based on input 826, e.g., according to any other algorithm and/or calculation.

In some demonstrative aspects, as shown in FIG. 8, controller 800 may include an AFB mitigator ("Echo Canceller") 815 configured to reduce, remove, and/or cancel, partially or entirely, a portion of the signal generated by the speaker 808 from an output signal of the reference microphone 818.

For example, AFB mitigator 150 (FIG. 1) may include AFB mitigator 815 and/or may perform one or more functionalities of AFB mitigator 815.

In some demonstrative aspects, AFB mitigator 815 may include one or more elements of, and/or perform one or more functionalities of, adaptive AFB mitigator 350 (FIG. 3).

In some demonstrative aspects, AFB mitigator 815 may include one or more elements of, and/or perform one or more functionalities of, adaptive AFB mitigator 450 (FIG. 4).

In some demonstrative aspects, AFB mitigator 815 may include one or more elements of, and/or perform one or more functionalities of, adaptive AFB mitigator 550 (FIG. 5).

In some demonstrative aspects, as shown in FIG. 8, controller 800 may include an AFB mitigator ("Echo Canceller") 825 configured to reduce, remove, and/or cancel, partially or entirely, a portion of the signal generated by the speaker 808 from an output signal of the residual-noise microphone 828.

For example, AFB mitigator 150 (FIG. 1) may include AFB mitigator 825 and/or may perform one or more functionalities of AFB mitigator 825.

In some demonstrative aspects, AFB mitigator 825 may include one or more elements of, and/or perform one or more functionalities of, adaptive AFB mitigator 350 (FIG. 3).

In some demonstrative aspects, AFB mitigator 825 may include one or more elements of, and/or perform one or more functionalities of, adaptive AFB mitigator 450 (FIG. 4).

In some demonstrative aspects, AFB mitigator 825 may include one or more elements of, and/or perform one or more functionalities of, adaptive AFB mitigator 550 (FIG. 5).

In some demonstrative aspects, controller 800 may apply any suitable linear and/or non-linear function to prediction filter input 812 and/or prediction filter input 822. For example, prediction filter 820 and/or prediction filter 820 may be configured according to a liner estimation function, or non-linear estimation function, e.g., a radial basis function.

In some demonstrative aspects, controller 800 may be configured according to an adaptive hybrid scheme. For example, as shown in FIG. 8, controller 800 may be configured to update one or more parameters of the prediction filter 810 and/or prediction filter 820, for example, based on the residual noise input 826.

Figure 9:
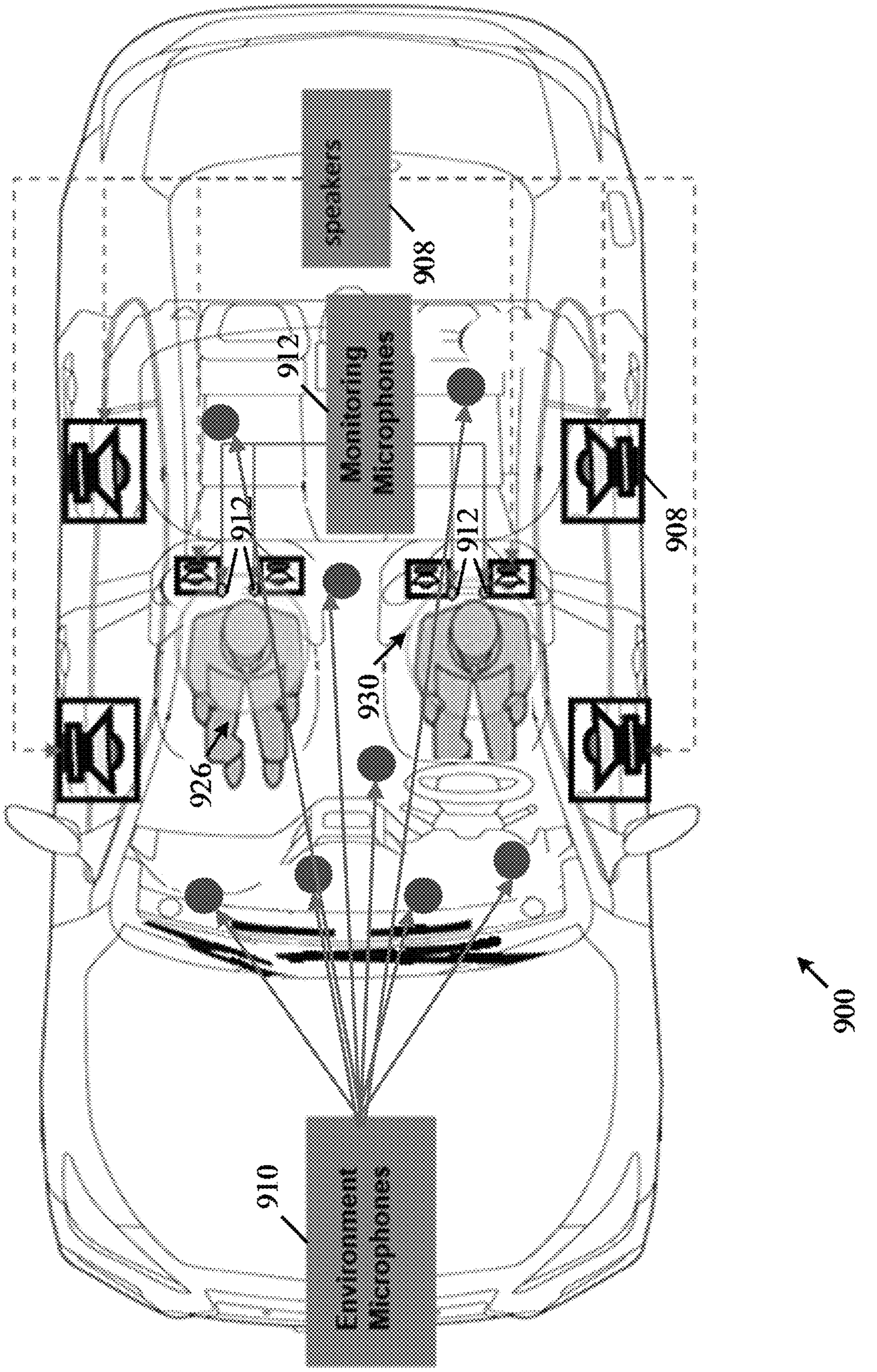
FIG. 9 is a schematic illustration of a vehicle including an AAC system, in accordance with some demonstrative aspects.

Reference is made to FIG. 9, which schematically illustrates a vehicle 900 including an AAC system, in accordance with some demonstrative aspects.

In one example, vehicle 940 may include alone or more elements and/or components of AAC system 100 (FIG. 1), for example, for controlling sound within one or more sound control zones within vehicle 900.

In some demonstrative aspects, as shown in FIG. 9, vehicle 900 may include a plurality of speakers 908, a plurality of residual-noise sensors ("monitoring microphones") 912, and a plurality of reference sensors ("environment microphones") 910.

In some demonstrative aspects, vehicle 900 may include AAC controller 102 (FIG. 1) configured to control the plurality of speakers 908 to provide a first sound control zone 930 for a driver of the vehicle 900, e.g., at a location of a headrest of a driver seat.

In some demonstrative aspects, AAC controller 102 (FIG. 1) may be configured to control the plurality of speakers 908 to provide a second sound control zone 926, for example, for a passenger, e.g., at a front seat near the driver seat, for example, at a location of a headrest of the passenger seat.

In some demonstrative aspects, as shown in FIG. 9, the plurality of monitoring microphones 912 may be located within the first and second sound control zones 930 and 926.

In some demonstrative aspects, as shown in FIG. 9, the plurality of environment microphones 910 may be located in an environment outside the sound control zones 930 and 926.

In other aspects, vehicle 900 may include any other number of the plurality of speakers 908, the plurality of monitoring microphones 912, and/or the plurality of environment microphones 910, any other arrangement, positions and/or locations of the plurality of speakers 908, the plurality of monitoring microphones 912, and/or the plurality of environment microphones 910, and/or any other additional or alternative components.

Figure 10:
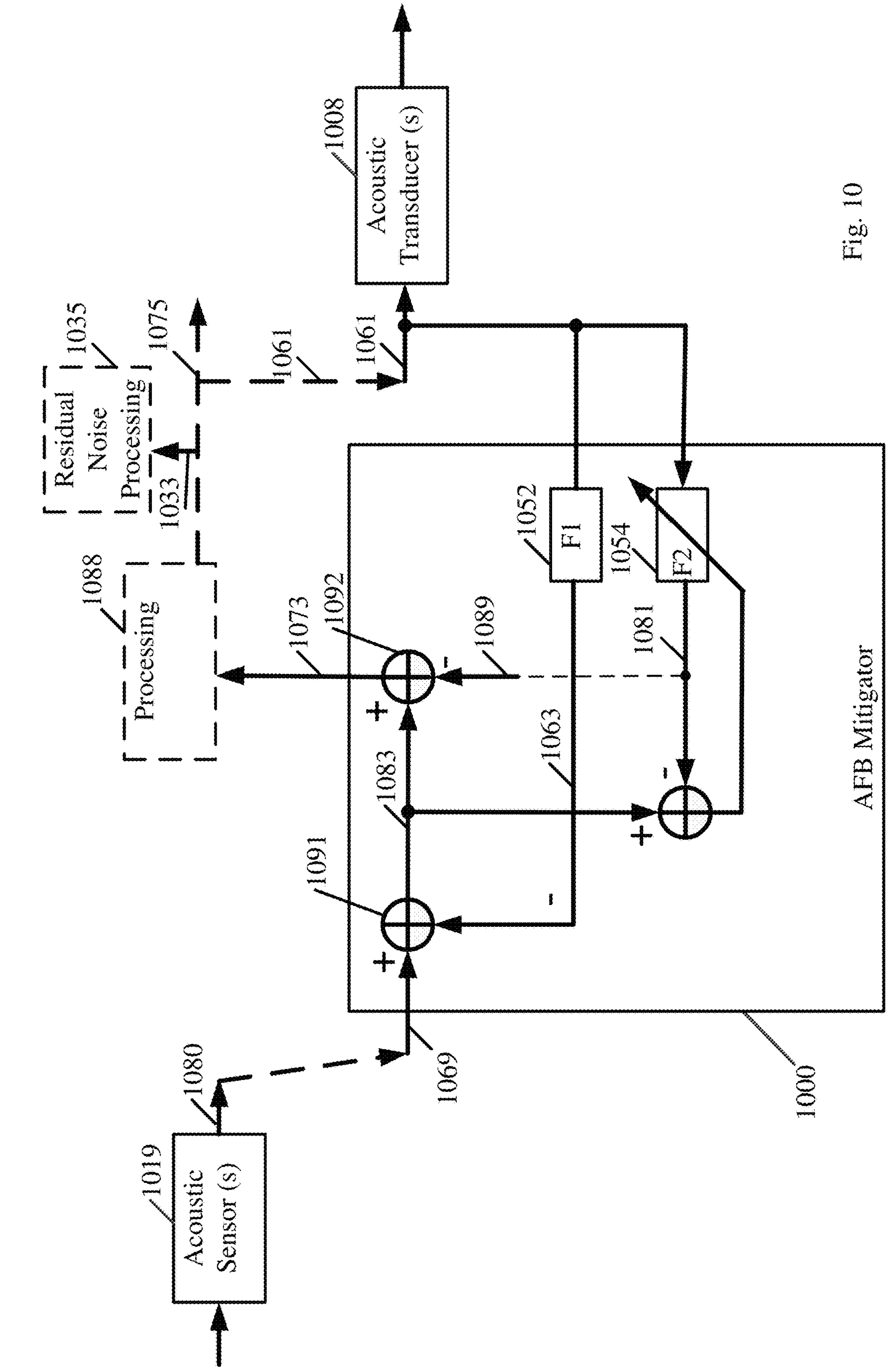
FIG. 10 is a schematic block diagram illustration of an AFB mitigator, in accordance with some demonstrative aspects.

Reference is made to FIG. 10, which schematically illustrates an AFB mitigator 1000, in accordance with some demonstrative aspects. For example, AFB mitigator 150 (FIG. 1) may include one or more elements of, and/or perform one or more functionalities of, adaptive AFB mitigator 1000.

In some demonstrative aspects, AFB mitigator 1000 may be configured to mitigate acoustic feedback between at least one acoustic transducer 1008, e.g., one acoustic transducer 1008 or a plurality of acoustic transducers 1008, and at least one acoustic sensor 1019, e.g., one acoustic sensor 1019 or a plurality of acoustic sensors 1019, e.g., as described below.

In some demonstrative aspects, AFB mitigator 1000 may be configured to provide an output including an AFB-mitigated signal, e.g., an AFB-mitigated signal 1073, which may be based on an AFB mitigation applied to a sensor acoustic pattern 1080 sensed by the acoustic sensor 1019, e.g., as described below.

In some demonstrative aspects, the AFB-mitigated signal 1073 may be based on sensor acoustic pattern 1080 sensed by the acoustic sensor 1019, for example, post AFB mitigation to mitigate acoustic feedback between acoustic transducer 1008 and acoustic sensor 1019, e.g., as described below.

In some demonstrative aspects, AFB mitigator 1000 may include a first filter (F1) 1052, which may be configured to generate a first filtered signal 1063, for example, by filtering a first input signal 1061, for example, according to and/or based on a first filter function, e.g., as described below.

In some demonstrative aspects, the first input signal 1061 may be based on a transducer acoustic pattern to be output by the transducer 1008, e.g., as described below.

In some demonstrative aspects, AFB mitigator 1000 may include a second filter (F2) 1054, which may be configured to generate a second filtered signal 1081, for example, by filtering the first input signal 1061, for example, according to and/or based on a second filter function, e.g., as described below.

In some demonstrative aspects, the second filter 1054 may include an adaptive filter, e.g., as described below.

In some demonstrative aspects, the second filter 1054 may be adapted, for example, based on a difference between an AFB-mitigated signal 1083 and the second filtered signal 1081, e.g., as described below.

In some demonstrative aspects, the AFB-mitigated signal 1083 may be based on a difference between a second input signal 1069 and the first filtered signal 1063, e.g., as described below.

In some demonstrative aspects, the second input signal 1069 may be based on the sensor acoustic pattern 1080 sensed by the acoustic sensor 1019, e.g., as described below.

In some demonstrative aspects, the second input signal 1069 may be based directly, e.g., may include or may be equal to, the sensor acoustic pattern 1080 sensed by the acoustic sensor 1019, e.g., as described above.

In some demonstrative aspects, the second input signal 1069 may be based indirectly on the sensor acoustic pattern 1080 sensed by the acoustic sensor 1019. For example, the second input signal 1069 may be include a processed signal, which may be based on processing of the sensor acoustic pattern 1080 sensed by the acoustic sensor 1019, e.g., as described above.

In some demonstrative aspects, the second input signal 1069 may be based on audio, voice, noise, or the like, which may be sensed in an environment of the acoustic sensor 1019.

In some demonstrative aspects, the first filter 1052 may be configured to generate the first filtered signal 1063 including a first estimation of the AFB between acoustic transducer 1008 and acoustic sensor 1019, e.g., as described above.

In some demonstrative aspects, the second filter 1054 may be configured to generate the second filtered signal 1081 including a second estimation of the AFB between acoustic transducer 1008 and acoustic sensor 1019, e.g., as described above.

In some demonstrative aspects, the second filter 1054 may be configured to generate the second filtered signal 1081, for example, based on a change in the AFB between acoustic transducer 1008 and acoustic sensor 1019, e.g., as described above.

In some demonstrative aspects, the first filter 1052 may include a fixed filter having a fixed filter function, e.g., as described above.

In some demonstrative aspects, the first filter 1052 may include a fixed IIR filter, e.g., as described above.

In other aspects, the first filter 1052 may include a fixed FIR filter, or any other type of fixed filter.

In some demonstrative aspects, the fixed filter function of filter 1052 may be based, for example, on a predefined acoustic configuration between the acoustic transducer 1008 and the acoustic sensor 1019.

In some demonstrative aspects, AFB mitigator 1000 may include a first subtractor 1091 to generate a first AFB-mitigated signal 1083, for example, by subtracting the first filtered signal 1063 from the second input signal 1069.

In some demonstrative aspects, AFB mitigator 1000 may include a second subtractor 1092 to generate a second AFB-mitigated signal, e.g., AFB-mitigated signal 1073, for example, by subtracting a signal 1089 from the first AFB-mitigated signal 1083.

In some demonstrative aspects, the signal 1089 may be based on the second filtered signal 1081.

In some demonstrative aspects, the signal 1089 may be based directly, e.g., may include or may be equal to, the second filtered signal 1081, e.g., as described above with reference to FIG. 3.

In some demonstrative aspects, the signal 1089 may be based indirectly on the second filtered signal 1081. For example, the signal 1089 may be generated, for example, by another filter (not shown in FIG. 10), which may be adapted based on the second filtered signal 1081, e.g., as described above with reference to FIG. 4 and/or FIG. 5.

In some demonstrative aspects, the second filter 1054 may be adapted based on a difference between the first AFB-mitigated signal 1083 and the second filtered signal 1081.

In some demonstrative aspects, the second filter 1054 may be implemented by a short adaptive FIR filter, e.g., as described above.

In other aspects, the second filter 1054 may include any other adaptive FIR filter, an adaptive IIR filter, and/or any other adaptive filter.

In some demonstrative aspects, the AFB-mitigated signal 1073 may be processed to provide a signal 1075, for example, according to one or more processing techniques 1088.

In some demonstrative aspects, the signal 1075 may be provided as an input to one or more elements of a system or device implementing the at least one acoustic transducer 1008 and the at least one acoustic sensor 1019, e.g., as described below.

In some demonstrative aspects, the signal 1075 may be provided as an output signal, for example, an output audio signal to be provided to a user of a device implementing the acoustic sensor 1019 and acoustic transducer 1008.

In some demonstrative aspects, the signal 1061 may be based on the signal 1075, e.g., as described below.

In some demonstrative aspects, the signal 1061 may be based directly, e.g., may include or may be equal to, the signal 1075, e.g., as described above with reference to FIGS. 3, 4, and/or 5.

In some demonstrative aspects, the signal 1061 may be based indirectly on the signal 1075. For example, the signal 1061 may be generated, for example, based on further processing of the signal 1075 with or without one or more other signals, e.g., as described above with reference to FIGS. 3, 4 and/or 5.

In some demonstrative aspects, the processing techniques 1088 may be configured to generate the signal 1075 configured for AAC processing, e.g., as described above.

In some demonstrative aspects, the processing techniques 1088 may be configured to generate the signal 1075 by applying a PF to the AFB-mitigated signal 1073, e.g., as described above with reference to FIGS. 3, 4 and/or 5.

In some demonstrative aspects, the at least one acoustic sensor 1019 may include at least one reference noise sensor, e.g., a reference noise sensor 119 (FIG. 1).

For example, the second input signal 1069 may represent noise sensed by a reference noise sensor, e.g., a reference noise sensor 119 (FIG. 1), at a noise sensing location, e.g., noise sensing location 105 (FIG. 1).

For example, the processing techniques 1088 may be configured to generate the signal 1075 by applying a PF to the AFB-mitigated signal 1073, e.g., as described above with reference to FIGS. 3, 4 and/or 5.

In one example, AFB mitigator 618 (FIG. 6) may be configured to implement one or more functionalities of AFB mitigator 1000, for example, to generate the input 604 (FIG. 6) and/or the input 608 (FIG. 6), which may include, or may be based on, the AFB-mitigated signal 1073.

For example, the processing techniques 1088 may be configured to perform one or more functionalities of the estimator 610 (FIG. 6), for example, to generate the sound control signal 612 (FIG. 6), which may include, or may be based on, the signal 1075.

In some demonstrative aspects, the at least one acoustic sensor 1019 may include at least one residual noise sensor, e.g., a residual noise sensor 121 (FIG. 1).

For example, the second input signal 1069 may represent noise sensed by a residual noise sensor, e.g., a residual noise sensor 121 (FIG. 1), at a residual noise sensing location, e.g., residual noise sensing location 107 (FIG. 1).

For example, the processing techniques 1088 may be configured to generate the signal 1075 representing an AFB-mitigated residual-noise signal 1033.

For example, the AFB-mitigated residual-noise signal 1033 may be processed according to one or more residual noise processing techniques 1035.

For example, controller 193 (FIG. 1) may be configured to implement residual noise processing techniques 1035 to process the AFB-mitigated residual-noise signal 1033, which may be generated, for example, based on a residual noise input 106 (FIG. 1), e.g., as described above.

In one example, residual noise processing techniques 1035 may be implemented to adapt one or more parameters of the estimation function of estimator 610 (FIG. 6), for example, based on the AFB-mitigated residual-noise signal 1033, e.g., as described above.

In some demonstrative aspects, the processing techniques 1088 may be configured to generate the signal 1075 to represent an acoustic pattern of a virtual acoustic sensor, e.g., which may be located at a location different from a location of a physical acoustic sensor 1019, e.g., as described below.

In one example, the processing techniques 1088 may be configured to generate the signal 1075, for example, by applying to the AFB-mitigated signal 1073 an acoustic transfer function, which may be based, for example, on an acoustic path between the location of the virtual acoustic sensor and the location of the physical acoustic sensor 1019.

In some demonstrative aspects, the processing techniques 1088 may be configured to generate the signal 1075 to represent the AFB-mitigated residual-noise signal 1033 of a virtual residual noise acoustic sensor, which may be located at a virtual residual noise acoustic sensing location, e.g., as described below.

In some demonstrative aspects, the virtual residual noise acoustic sensing location may be different from a location of a physical acoustic sensor 1019, which may provide the second input signal 1069.

In some demonstrative aspects, processing techniques 1088 may be configured to generate a first signal (also referred to as "physical sensor filtered signal") based on the AFB-mitigated signal 1073.

In some demonstrative aspects, processing techniques 1088 may be configured to generate the physical sensor filtered signal, for example, by applying to the AFB-mitigated signal 1073 an acoustic transfer function, which may be based on an acoustic path between the location of the physical acoustic sensor 1019 and the location of the virtual acoustic sensor.

In some demonstrative aspects, processing techniques 1088 may be configured to generate a second signal (also referred to as "physical transducer filtered signal") based on the signal 1061 to be provided to the at least one transducer 1008.

In some demonstrative aspects, processing techniques 1088 may be configured to generate the physical transducer filtered signal, for example, by applying to signal 1061 an acoustic transfer function, which may be based on an acoustic path between the location of the acoustic transducer 1008 and the location of the virtual acoustic sensor.

In some demonstrative aspects, processing techniques 1088 may be configured to generate the signal 1075 to represent the AFB-mitigated residual-noise signal 1033 of the virtual residual noise acoustic sensor, for example, based on a summation of the physical sensor filtered signal and the physical transducer filtered signal.

In some demonstrative aspects, the residual noise processing techniques 1035 may be implemented with respect to the AFB-mitigated residual-noise signal 1033 of the virtual residual noise acoustic sensor.

For example, the residual noise processing techniques 1035 may be implemented to adapt one or more parameters of the estimation function of estimator 610 (FIG. 6), for example, based on the AFB-mitigated residual-noise signal 1033 of the virtual residual noise acoustic sensor, e.g., as described above.

In some demonstrative aspects, the signal 1061 may be provided independently of, or unrelated to, the signal 1075 and/or the AFB-mitigated signal 1073.

In some demonstrative aspects, the signal 1061 may be based on a first audio signal to be provided to a user of a device implementing AFB mitigator 1000, and/or the sensor acoustic pattern 1080 may be based on a second audio signal to be processed by the processing techniques 1088.

In some demonstrative aspects, AFB mitigator 1000 may be implemented by a user device, for example, a Smartphone, a tablet, a laptop, or any other computing device, e.g., as described below.

For example, the AFB mitigator 1000 may be configured to mitigate the AFB between acoustic transducer 1008 and acoustic sensor 1019, for example, in a use case when the user of the computing device is simultaneously utilizing the acoustic transducer 1008, e.g., to provide an audio output, while acoustic sensor 1019 is being operated to sense the sensor acoustic pattern 1080 in an environment of the computing device, e.g., as described below.

In some demonstrative aspects, AFB mitigator 1000 may include one or more elements of, and/or perform one or more functionalities of, adaptive AFB mitigator 350 (FIG. 3).

In some demonstrative aspects, AFB mitigator 1000 may be configured to support a technical solution utilizing a virtual signal in the process of adaptation of the adaptive filter 1054, e.g., as described above with reference to FIG. 4.

In some demonstrative aspects, AFB mitigator 1000 may include one or more elements of, and/or perform one or more functionalities of, adaptive AFB mitigator 450 (FIG. 4).

In some demonstrative aspects, AFB mitigator 1000 may be configured to implement the first filter 1052 including a fixed filter, while utilizing the internally generated virtual signal to adapt another filter (not shown in FIG. 1) of AFC mitigator 1000, e.g., as described above with reference to FIG. 5.

In some demonstrative aspects, AFB mitigator 1000 may include one or more elements of, and/or perform one or more functionalities of, adaptive AFB mitigator 550 (FIG. 5).

Figure 11:
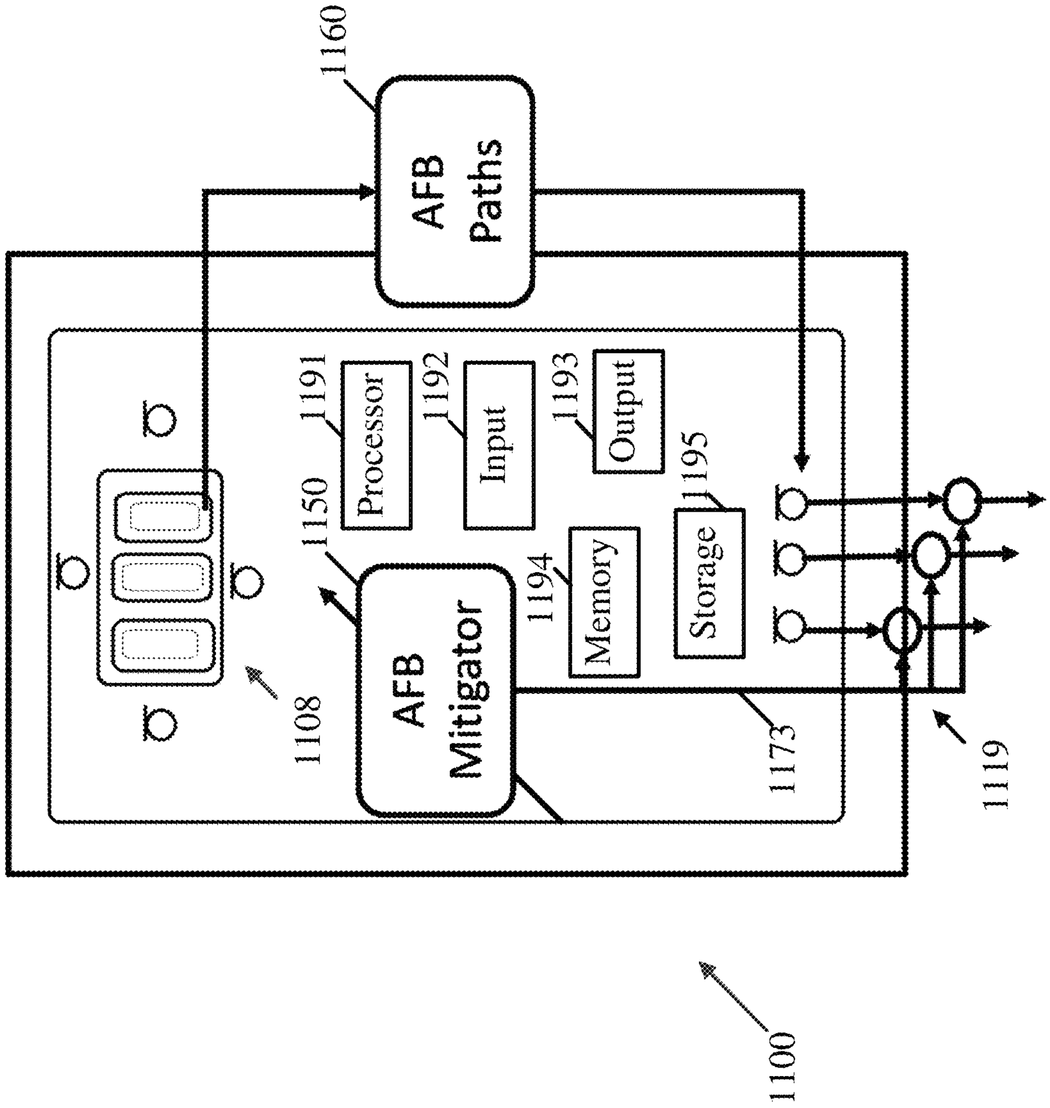
FIG. 11 is a schematic block diagram illustration of a computing device including an AFB mitigator, in accordance with some demonstrative aspects.

Reference is made to FIG. 11, which schematically illustrates a computing device 1100 including an AFB mitigator 1150, in accordance with some demonstrative aspects.

In some demonstrative aspects, computing device 1100 may include, for example, a User Equipment (UE), a Mobile Device (MD), a Smartphone, a mobile computer, a laptop computer, a notebook computer, a tablet computer, a desktop computer, a Personal Computer (PC), a handheld computer, a handheld device, a wearable device, a consumer device, a vehicular device, a non-vehicular device, a mobile or portable device, a non-mobile or non-portable device, a mobile phone, a cellular telephone, a video device, an audio device, an Audio/Video (A/V) device, a video source, an audio source, a video sink, an audio sink, a stereo tuner, a broadcast radio receiver, a gaming device, a media player, a music player, or the like.

In some demonstrative aspects, computing device 1100 may include, for example, one or more of a processor 1191, an input unit 1192, an output unit 1193, a memory unit 1194, and/or a storage unit 1195. Device 1100 may optionally include other suitable hardware components and/or software components. In some demonstrative aspects, some or all of the components of computing device 1100 may be enclosed in a common housing or packaging, and may be interconnected or operably associated using one or more wired or wireless links. In other aspects, components of one or more of computing device 1100 may be distributed among multiple or separate devices.

In some demonstrative aspects, processor 1191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 1191 may execute instructions, for example, of an Operating System (OS) of computing device 1100 and/or of one or more suitable applications.

In some demonstrative aspects, input unit 1192 may include, for example, one or more acoustic sensors 1119, e.g., audio microphones.

In some demonstrative aspects, input unit 1192 may also include, for example, a keyboard, a keypad, a mouse, a touch-screen, a touch-pad, a track-ball, a stylus, and/or other suitable pointing device or input device.

In some demonstrative aspects, output unit 1193 may include, for example, one or more acoustic transducers 1108, e.g., audio speakers.

In some demonstrative aspects, output unit 1193 may also include, for example, a monitor, a screen, a touch-screen, a flat panel display, a Light Emitting Diode (LED) display unit, a Liquid Crystal Display (LCD) display unit, and/or other suitable output devices.

In some demonstrative aspects, memory unit 1194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 1195 may include, for example, a hard disk drive, a disk drive, a solid-state drive (SSD), and/or other suitable removable or non-removable storage units. Memory unit 1194 and/or storage unit 1195, for example, may store data processed by computing device 1100.

In some demonstrative aspects, AFB mitigator 1150 may be implemented by processor 1191, for example, as part of the OS of computing device 1100, as part of an application to be executed by computing device 1100, and/or as a dedicated AFB mitigation application to be executed by computing device.

In some demonstrative aspects, AFB mitigator 1150 may include one or more elements of, and/or perform one or more functionalities of, AFB mitigator 1000 (FIG. 10).

In some demonstrative aspects, AFB mitigator 1150 may be configured to mitigate acoustic feedback 1160 between the one or more acoustic transducers 1108 and the one or more acoustic sensors 1119, e.g., as described below.

In some demonstrative aspects, AFB mitigator 1100 may be configured to mitigate the AFB between the one or more acoustic transducers 1108 and the one or more acoustic sensors 1119, for example, in a use case when the user of the computing device 1100 is simultaneously utilizing the acoustic transducers 1108, e.g., to provide an audio output, while acoustic sensors 1119 is being operated to sense a sensor acoustic pattern in an environment of the computing device 1100, e.g., as described below.

In some demonstrative aspects, AFB mitigator 1100 may be configured to mitigate the AFB between acoustic transducers 1108 and acoustic sensors 1119, for example, during a speakerphone conversation between the user of the computing device 110 and another person. For example, the sensor acoustic pattern sensed by acoustic sensors 1119 may include voice data of the user, and the acoustic pattern generated by the acoustic transducers 1108 may include voice data of the other person, e.g., as received via a communication link between the computing device 1100 and a communication network. For example, computing device 1100 may be configured to process the voice data of the user for transmission to the other person, e.g., via the communication network.

In one example, AFB mitigator 1150 may be configured to provide a mitigator output 1173, which may be configured to mitigate a feedback effect for an "Open-Speaker" Mode of operation of the computing device 1110.

For example, at the "Open-Speaker" mode, the acoustic feedback 1160 may include a feedback of reproduced voice/audio from the acoustic transducers 1108 back the to the acoustic sensor 1119.

For example, AFB mitigator 1150 may be configured to generate the mitigator output 1173 to be applied to the sensed acoustic pattern sensed by the acoustic sensors 1119.

For example, the mitigator output 1173 may be configured to provide a relatively clear "Voice" for the open speaker mode, including the voice of the user of the computing device 1110, which is to be transmitted back to the other side of the line.

Figure 12:
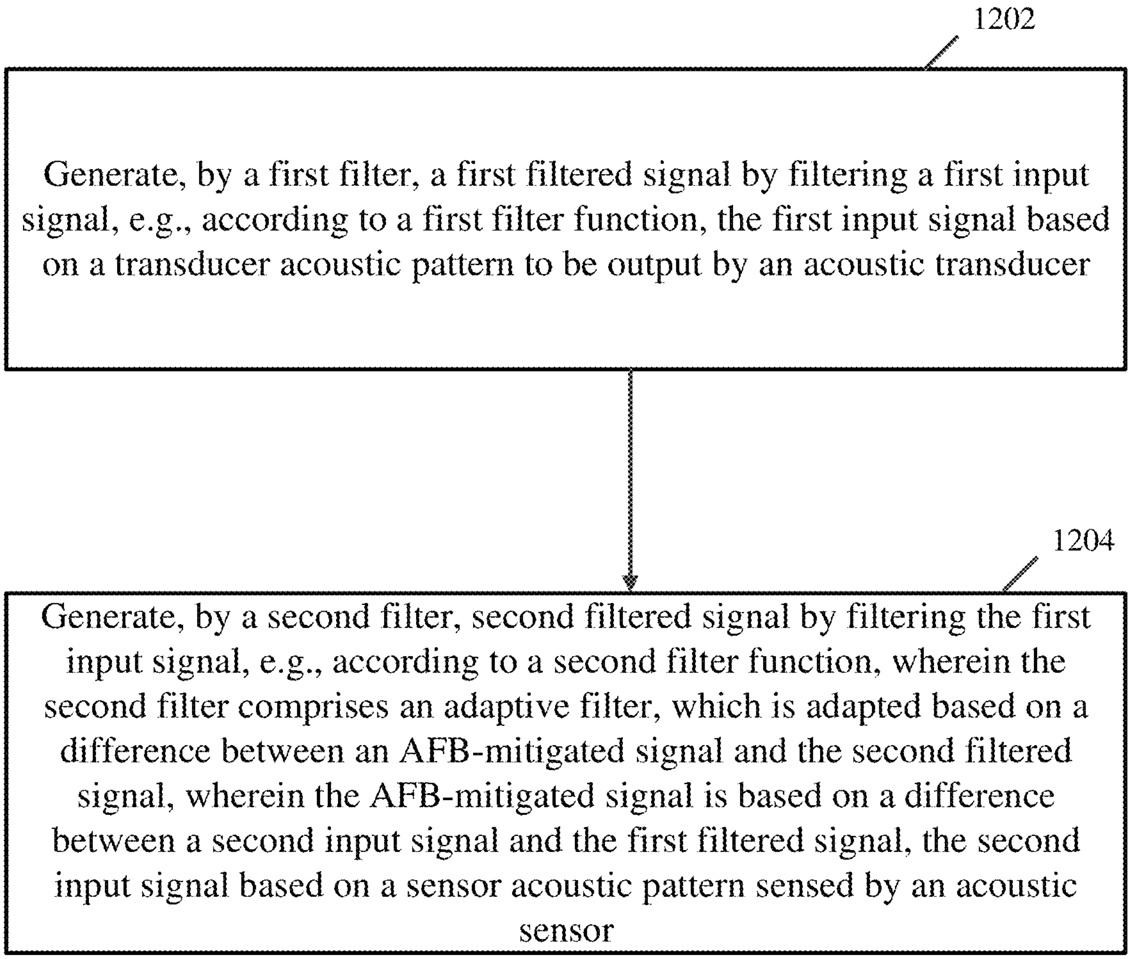
FIG. 12 is a schematic flow-chart illustration of a method of adaptive AFB mitigation, in accordance with some demonstrative aspects.

Reference is made to FIG. 12, which illustrates a method of adaptive AFB mitigation. For example, one or more of the operations of FIG. 12 may be performed by one or more components of AAC system 100 (FIG. 1), controller 102 (FIG. 1), controller 193 (FIG. 1), AFB mitigator 150 (FIG. 1), AFB mitigator 350 (FIG. 3), AFB mitigator 450 (FIG. 4), AFB mitigator 550 (FIG. 5), AFB mitigator 1000 (FIG. 10), AFB mitigator 1150 (FIG. 11), controller 600 (FIG. 6), and/or controller 800 (FIG. 8).

In some demonstrative aspects, the method of FIG. 12 may include a method of mitigating AFB between an acoustic transducer and an acoustic sensor, for example, in an AAC system and/or any other system, e.g., as described below.

In some demonstrative aspects, as indicated at block 1202, the method may include generating, by a first filter, a first filtered signal by filtering a first input signal, for example, according to and/or based on a first filter function. For example, the first input signal may be based on a transducer acoustic pattern to be output by the acoustic transducer. For example, AFB mitigator 1000 (FIG. 10) may be configured to generate the first filtered signal by the first filter 1052 (FIG. 10), for example, by filtering the first input signal 1061 (FIG. 10), for example, according to and/or based on a first filter function, e.g., as described above.

In some demonstrative aspects, as indicated at block 1204, the method may include generating by a second filter second filtered signal by filtering the first input signal, for example, according to and/or based on a second filter function. For example, wherein the second filter my include an adaptive filter, which may be adapted, for example, based on a difference between an AFB-mitigated signal and the second filtered signal. For example, the AFB-mitigated signal may be based on a difference between a second input signal and the first filtered signal. For example, the second input signal may be based on a sensor acoustic pattern sensed by the acoustic sensor. For example, AFB mitigator 1000 (FIG. 10) may be configured to generate the second filtered signal 1081 (FIG. 10) by the second filter 1054 (FIG. 10), which may be adapted based on a difference between the AFB-mitigated signal 1083 (FIG. 10) and the second filtered signal 1081 (FIG. 10), e.g., as described above.

Figure 13:
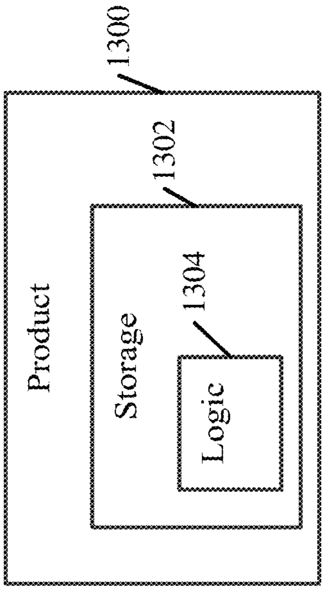
FIG. 13 is a schematic block diagram illustration of a product of manufacture, in accordance with some demonstrative aspects.

Reference is made to FIG. 13, which schematically illustrates a product of manufacture 1300, in accordance with some demonstrative aspects. Product 1300 may include one or more tangible computer-readable ("machine readable") non-transitory storage media 1302, which may include computer-executable instructions, e.g., implemented by logic 1304, operable to, when executed by at least one processor, e.g., computer processor, enable the at least one processor to implement one or more operations of AAC system 100 (FIG. 1), controller 102 (FIG. 1), controller 193 (FIG. 1), AFB mitigator 150 (FIG. 1), AFB mitigator 350 (FIG. 3), AFB mitigator 450 (FIG. 4), AFB mitigator 550 (FIG. 5), AFB mitigator 1000 (FIG. 10), AFB mitigator 1150 (FIG. 11), controller 600 (FIG. 6), and/or controller 800 (FIG. 8); to perform one or more operations, and/or to perform, trigger and/or implement one or more operations, communications and/or functionalities described above with reference to FIGS. 1, 2, 3, 4, 5, 6, 7, 8, 9, 10, 11 and/or 12, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative aspects, product 1300 and/or storage media 1302 may include one or more types of computer-readable storage media capable of storing data, including volatile memory, non-volatile memory, removable or non-removable memory, erasable or non-erasable memory, writeable or re-writeable memory, and the like. For example, storage media 1302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language.

EXAMPLES

The following examples pertain to further aspects.

Example 1 includes an apparatus comprising an Acoustic Feedback (AFB) mitigator configured to mitigate AFB between an acoustic transducer and an acoustic sensor, the AFB mitigator comprising a first filter configured to generate a first filtered signal by filtering a first input signal, the first input signal based on a transducer acoustic pattern to be output by the acoustic transducer; and a second filter configured to generate a second filtered signal by filtering the first input signal, wherein the second filter comprises an adaptive filter, which is adapted based on a difference between an AFB-mitigated signal and the second filtered signal, wherein the AFB-mitigated signal is based on a difference between a second input signal and the first filtered signal, wherein the second input signal is based on a sensor acoustic pattern sensed by the acoustic sensor.

Example 2 includes the subject matter of Example 1, and optionally, wherein the first filter comprises a fixed filter having a fixed filter function.

Example 3 includes the subject matter of Example 2, and optionally, wherein the fixed filter function is based on a predefined acoustic configuration of a system comprising the acoustic transducer and the acoustic sensor.

Example 4 includes the subject matter of Example 2 or 3, and optionally, wherein the fixed filter function is based on a predefined acoustic configuration between the acoustic transducer and the acoustic sensor.

Example 5 includes the subject matter of any one of Examples 2-4, and optionally, comprising a first subtractor to generate a first AFB-mitigated signal by subtracting the first filtered signal from the second input signal, and a second subtractor to generate a second AFB-mitigated signal by subtracting the second filtered signal from the first AFB-mitigated signal, wherein the second filter is adapted based on a difference between the first AFB-mitigated signal and the second filtered signal.

Example 6 includes the subject matter of Example 5, and optionally, wherein the first input signal is based on an output of a prediction filter, wherein an input to of the prediction filter is based on the second AFB-mitigated signal.

Example 7 includes the subject matter of Example 2, and optionally, comprising a third filter configured to generate a third filtered signal by filtering the first input signal, wherein the third filter comprises an adaptive filter, which is adapted based on subtraction of a filtered predefined signal from the difference between the AFB-mitigated signal and the second filtered signal, wherein the filtered predefined signal comprises a predefined signal filtered by the third filter.

Example 8 includes the subject matter of Example 7, and optionally, wherein the predefined signal comprises a noise signal.

Example 9 includes the subject matter of Example 7 or 8, and optionally, wherein a frequency spectrum of the predefined signal is different from a frequency spectrum of the first input signal.

Example 10 includes the subject matter of any one of Examples 7-9, and optionally, comprising an adder to generate a modified sensor signal by adding the filtered predefined signal to the second input signal; a first subtractor to generate a first AFB-mitigated signal by subtracting the first filtered signal from the modified sensor signal; a second subtractor to generate a second AFB-mitigated signal by subtracting from the first AFB-mitigated signal a sum of filtered signals, the sum of filtered signals comprising a sum of the third filtered signal and the filtered predefined signal.

Example 11 includes the subject matter of Example 10, and optionally, wherein the first input signal is based on an output of a prediction filter, wherein an input to of the prediction filter is based on the second AFB-mitigated signal.

Example 12 includes the subject matter of Example 1, and optionally, wherein the first filter comprises an adaptive filter, which is adapted based on a subtraction of a filtered predefined signal from the difference between the AFB-mitigated signal and the second filtered signal, wherein the filtered predefined signal comprises a predefined signal filtered by the first filter.

Example 13 includes the subject matter of Example 12, and optionally, wherein the predefined signal comprises a noise signal.

Example 14 includes the subject matter of Example 12 or 13, and optionally, wherein a frequency spectrum of the predefined signal is different from a frequency spectrum of the first input signal.

Example 15 includes the subject matter of any one of Examples 12-14, and optionally, comprising an adder to generate a modified sensor signal by adding the filtered predefined signal to the second input signal; a first subtractor to generate a first AFB-mitigated signal by subtracting the first filtered signal from the modified sensor signal; and a second subtractor to generate a second AFB-mitigated signal by subtracting the filtered predefined signal from the first AFB-mitigated signal.

Example 16 includes the subject matter of Example 15, and optionally, wherein the first input signal is based on an output of a prediction filter, wherein an input to of the prediction filter is based on the second AFB-mitigated signal.

Example 17 includes the subject matter of any one of Examples 1-16, and optionally, wherein the first filter is configured to generate the first filtered signal comprising a first estimation of the AFB, and wherein the second filter is configured to generate the second filtered signal comprising a second estimation of the AFB.

Example 18 includes the subject matter of any one of Examples 1-17, and optionally, wherein the second filter is configured to generate the second filtered signal based on a change in the AFB.

Example 19 includes the subject matter of any one of Examples 1-18, and optionally, comprising a Prediction Filter (PF) configured to generate a PF output based on a PF input of an Active Acoustic Control (AAC) system comprising the acoustic transducer and the acoustic sensor, wherein the first input signal is based on the PF output, wherein the PF input is based on the AFB-mitigated signal.

Example 20 includes the subject matter of Example 19, and optionally, wherein the first input signal is based on a combination of the PF output and at least one of an audio signal or a voice signal.

Example 21 includes the subject matter of any one of Examples 1-20, and optionally, wherein the first input signal is based on at least one of an audio signal or a voice signal.

Example 22 includes the subject matter of any one of Examples 1-21, and optionally, wherein the second filter is adapted based on an Least Mean Squares (LMS) algorithm, or an LMS algorithm variant.

Example 23 includes the subject matter of any one of Examples 1-22, and optionally, wherein at least one of the first filter or the second filter is a Finite Impulse Response (FIR) filter.

Example 24 includes the subject matter of any one of Examples 1-23, and optionally, wherein at least one of the first filter or the second filter is an Infinite Impulse Response (IIR) filter.

Example 25 includes a product comprising one or more tangible computer-readable non-transitory storage media comprising instructions operable to, when executed by at least one processor, cause an Acoustic Feedback (AFB) mitigator to mitigate AFB between an acoustic transducer and an acoustic sensor, wherein, the instructions, when executed, cause the AFB mitigator to generate by a first filter a first filtered signal by filtering a first input signal, the first input signal based on a transducer acoustic pattern to be output by the acoustic transducer; and generate by a second filter a second filtered signal by filtering the first input signal, wherein the second filter comprises an adaptive filter, which is adapted based on a difference between an AFB-mitigated signal and the second filtered signal, wherein the AFB-mitigated signal is based on a difference between a second input signal and the first filtered signal, wherein the second input signal is based on a sensor acoustic pattern sensed by the acoustic sensor.

Example 26 includes the subject matter of Example 25, and optionally, wherein the instructions, when executed, cause the AFB mitigator to perform one or more operations according to any of Examples 1-24.

Example 27 includes a method comprising mitigating Acoustic Feedback (AFB) between an acoustic transducer and an acoustic sensor, wherein mitigating the AFB comprises generating by a first filter a first filtered signal by filtering a first input signal, the first input signal based on a transducer acoustic pattern to be output by the acoustic transducer; and generating by a second filter a second filtered signal by filtering the first input signal, wherein the second filter comprises an adaptive filter, which is adapted based on a difference between an AFB-mitigated signal and the second filtered signal, wherein the AFB-mitigated signal is based on a difference between a second input signal and the first filtered signal, wherein the second input signal is based on a sensor acoustic pattern sensed by the acoustic sensor.

Example 28 comprises the subject matter of Example 27, and optionally comprising one or more operations according to any of Examples 1-24.

Example 29 comprises an acoustic control system comprising the apparatus of any of Examples 1-24.

Example 30 comprises a device comprising at least one acoustic sensor, at least one acoustic transducer, and the apparatus of any of Examples 1-24.

Example 31 comprises an apparatus comprising means for executing any of the described operations of any of Examples 1-24.

Example 32 comprises an apparatus comprising: a memory interface; and processing circuitry configured to: perform any of the described operations of any of Examples 1-24.

Example 33 comprises a method comprising any of the described operations of any of Examples 1-24.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

an Acoustic Feedback (AFB) mitigator configured to mitigate AFB between an acoustic transducer and an acoustic sensor, the AFB mitigator comprising:

a first filter configured to provide a first filtered signal by filtering a first signal, the first signal is based on a first acoustic pattern to be provided to the acoustic transducer; and a second filter configured to provide a second filtered signal by filtering a second signal comprising the first signal, wherein the second filter comprises an adaptive filter, which is adapted based on a difference between an AFB-mitigated signal and a third filtered signal, wherein the third filtered signal comprises a third signal filtered by the second filter, wherein the AFB-mitigated signal is based on a difference between a fourth signal and the first filtered signal, the fourth signal is based on a second acoustic pattern sensed by the acoustic sensor.

2. The apparatus of claim 1, wherein a frequency spectrum of the third signal is different from a frequency spectrum of the first signal.

3. The apparatus of claim 1, wherein the third signal comprises a predefined signal.

4. The apparatus of claim 1, wherein the third signal comprises a predefined frequency spectrum.

5. The apparatus of claim 1, wherein the third signal comprises a noise signal.

6. The apparatus of claim 1 comprising:

an adder to provide the fourth signal by adding the third filtered signal to a fifth signal, the fifth signal based on the second acoustic pattern sensed by the acoustic sensor;

a first subtractor to provide a first AFB-mitigated signal by subtracting the first filtered signal from the fourth signal; and a second subtractor to provide a second AFB-mitigated signal by subtracting from the first AFB-mitigated signal a sum of filtered signals, the sum of filtered signals comprising a sum of the second filtered signal and the third filtered signal.

7. The apparatus of claim 6, wherein the AFB mitigator is configured to provide an AFB mitigator output based on the second AFB-mitigated signal.

8. The apparatus of claim 6, wherein the first signal is based on an output of a prediction filter, wherein an input of the prediction filter is based on the second AFB-mitigated signal.

9. The apparatus of claim 1 comprising a third filter configured to generate a fourth filtered signal by filtering the first signal, wherein the third filter comprises an other adaptive filter, which is adapted based on a difference between the AFB-mitigated signal and the fourth filtered signal, wherein the second filter is adapted based on a difference between a fifth signal and the third filtered signal, the fifth signal is based on the difference between the AFB-mitigated signal and the fourth filtered signal.

10. The apparatus of claim 1, wherein the first filter comprises a fixed filter having a fixed filter function.

11. The apparatus of claim 10, wherein the fixed filter function is based on a predefined acoustic configuration of a system comprising the acoustic transducer and the acoustic sensor.

12. The apparatus of claim 10, wherein the fixed filter function is based on a predefined acoustic configuration between the acoustic transducer and the acoustic sensor.

13. The apparatus of claim 1, wherein the first filter comprises an other adaptive filter, which is adapted based on the AFB-mitigated signal.

14. The apparatus of claim 1, wherein the first filter is configured to generate the first filtered signal comprising a first estimation of the AFB, and wherein the second filter is configured to generate the second filtered signal comprising a second estimation of the AFB.

15. The apparatus of claim 1, wherein the first signal is based on at least one of an audio signal or a voice signal.

16. The apparatus of claim 1, wherein the AFB mitigator is configured to provide an AFB mitigator output based on the AFB-mitigated signal.

17. The apparatus of claim 1, wherein the AFB mitigator is configured to mitigate AFB between one or more acoustic transducers and a plurality of acoustic sensors.

18. The apparatus of claim 1, wherein the AFB mitigator is configured to mitigate AFB between a plurality of acoustic transducers and one or more acoustic sensors.

19. The apparatus of claim 1, wherein the AFB mitigator is configured to mitigate AFB between a plurality of acoustic transducers and a plurality of acoustic sensors.

20. The apparatus of claim 1 comprising a controller of an Active Acoustic Control (AAC) system comprising the acoustic transducer and the acoustic sensor, the controller comprising a Prediction Filter (PF) configured to generate a PF output based on a PF input, wherein the first input signal is based on the PF output, wherein the PF input is based on the AFB-mitigated signal.

21. A device comprising:

at least one acoustic sensor;

at least one acoustic transducer; and an Acoustic Feedback (AFB) mitigator configured to mitigate AFB between the acoustic transducer and the acoustic sensor, the AFB mitigator comprising:

a first filter configured to provide a first filtered signal by filtering a first signal, the first signal is based on a first acoustic pattern to be provided to the acoustic transducer; and a second filter configured to provide a second filtered signal by filtering a second signal comprising the first signal, wherein the second filter comprises an adaptive filter, which is adapted based on a difference between an AFB-mitigated signal and a third filtered signal, wherein the third filtered signal comprises a third signal filtered by the second filter, wherein the AFB-mitigated signal is based on a difference between a fourth signal and the first filtered signal, the fourth signal is based on a second acoustic pattern sensed by the acoustic sensor.

22. The device of claim 21, wherein a frequency spectrum of the third signal is different from a frequency spectrum of the first signal.

23. The device of claim 21 comprising a mobile computing device comprising a memory, and a processor to execute instructions of an operating system of the mobile computing device.

24. A product comprising one or more tangible computer-readable non-transitory storage media comprising instructions operable to, when executed by at least one processor, cause an Acoustic Feedback (AFB) mitigator to mitigate AFB between an acoustic transducer and an acoustic sensor, wherein the instructions, when executed, cause the AFB mitigator to:

provide a first filtered signal by filtering a first signal by a first filter, the first signal is based on a first acoustic pattern to be provided to the acoustic transducer; and provide a second filtered signal by filtering a second signal by a second filter, the second signal comprising the first signal, wherein the second filter comprises an adaptive filter, which is adapted based on a difference between an AFB-mitigated signal and a third filtered signal, wherein the third filtered signal comprises a third signal filtered by the second filter, wherein the AFB-mitigated signal is based on a difference between a fourth signal and the first filtered signal, the fourth signal is based on a second acoustic pattern sensed by the acoustic sensor.

25. The product of claim 24, wherein a frequency spectrum of the third signal is different from a frequency spectrum of the first signal.

26. The product of claim 24, wherein the instructions, when executed, cause the AFB mitigator to:

provide the fourth signal by adding the third filtered signal to a fifth signal, the fifth signal based on the second acoustic pattern sensed by the acoustic sensor;

provide a first AFB-mitigated signal by subtracting the first filtered signal from the fourth signal; and provide a second AFB-mitigated signal by subtracting from the first AFB-mitigated signal a sum of filtered signals, the sum of filtered signals comprising a sum of the second filtered signal and the third filtered signal.

* * * * *